United States Patent
George et al.

(10) Patent No.: US 9,531,452 B2
(45) Date of Patent: Dec. 27, 2016

(54) HYBRID INTRA-CELL / INTER-CELL REMOTE UNIT ANTENNA BONDING IN MULTIPLE-INPUT, MULTIPLE-OUTPUT (MIMO) DISTRIBUTED ANTENNA SYSTEMS (DASS)

(71) Applicant: Corning Optical Communications LLC, Hickory, NC (US)

(72) Inventors: Jacob George, Horseheads, NY (US); Anthony Ng'Oma, Horseheads, NY (US); Rakesh Sambaraju, Corning, NY (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/721,357

(22) Filed: May 26, 2015

(65) Prior Publication Data

US 2015/0256237 A1 Sep. 10, 2015

Related U.S. Application Data

(63) Continuation of application No. PCT/US2013/070489, filed on Nov. 18, 2013.
(Continued)

(51) Int. Cl.
*H04B 1/02* (2006.01)
*H04L 1/02* (2006.01)
(Continued)

(52) U.S. Cl.
CPC ............ *H04B 7/0413* (2013.01); *H04B 7/024* (2013.01); *H04B 7/026* (2013.01)

(58) Field of Classification Search
CPC .... H04W 28/06; H04W 72/042; H04W 72/04; H04W 84/047; H04W 36/0083; H04W 36/026; H04B 7/024; H04B 7/026
See application file for complete search history.

(56) References Cited

U.S. PATENT DOCUMENTS

| 4,365,865 A | 12/1982 | Stiles |
| 4,449,246 A | 5/1984 | Seiler et al. |

(Continued)

FOREIGN PATENT DOCUMENTS

| AU | 645192 B | 10/1992 |
| AU | 731180 B2 | 3/1998 |

(Continued)

OTHER PUBLICATIONS

Heath, R.W.; Tao Wu; Young Hoon Kwon; Soong, A.C.K., "Multiuser MIMO in Distributed Antenna Systems With Out-of-Cell Interference," in Signal Processing, IEEE Transactions on, vol. 59, No. 10, pp. 4885-4899, Oct. 2011.*

(Continued)

*Primary Examiner* — Hirdepal Singh
*Assistant Examiner* — Amneet Singh
(74) *Attorney, Agent, or Firm* — C. Keith Montgomery

(57) ABSTRACT

Hybrid intra-cell/inter-cell remote unit antenna bonding in multiple-input, multiple-output (MIMO) distributed antenna systems (DASs), and related components, systems, and methods. The MIMO DASs are capable of supporting distributed MIMO communications with client devices. To provide enhanced MIMO coverage areas, hybrid intra-cell/inter-cell remote unit antenna bonding is employed. For example, if a client device has acceptable MIMO communications signal quality with MIMO antennas within a single remote unit, intra-cell bonding of the MIMO antennas can be employed to provide MIMO coverage for MIMO communications, which may avoid power imbalance issues that would result with inter-cell bonded MIMO antennas. How- (Continued)

ever, if a client device has acceptable MIMO communications signal quality with MIMO antennas in a separate, neighboring remote unit(s), inter-cell bonding of the MIMO antennas can be employed to provide MIMO coverage for MIMO communications.

20 Claims, 13 Drawing Sheets

Related U.S. Application Data

(60) Provisional application No. 61/731,043, filed on Nov. 29, 2012.

(51) Int. Cl.
  *H04B 7/04* (2006.01)
  *H04B 7/02* (2006.01)

(56) References Cited

U.S. PATENT DOCUMENTS

| | | |
|---|---|---|
| 4,573,212 A | 2/1986 | Lipsky |
| 4,665,560 A | 5/1987 | Lange |
| 4,867,527 A | 9/1989 | Dotti et al. |
| 4,889,977 A | 12/1989 | Haydon |
| 4,896,939 A | 1/1990 | O'Brien |
| 4,916,460 A | 4/1990 | Powell |
| 4,939,852 A | 7/1990 | Brenner |
| 4,972,346 A | 11/1990 | Kawano et al. |
| 5,039,195 A | 8/1991 | Jenkins et al. |
| 5,042,086 A | 8/1991 | Cole et al. |
| 5,056,109 A | 10/1991 | Gilhousen et al. |
| 5,059,927 A | 10/1991 | Cohen |
| 5,125,060 A | 6/1992 | Edmundson |
| 5,159,479 A | 10/1992 | Takagi |
| 5,187,803 A | 2/1993 | Sohner et al. |
| 5,189,718 A | 2/1993 | Barrett et al. |
| 5,189,719 A | 2/1993 | Coleman et al. |
| 5,206,655 A | 4/1993 | Caille et al. |
| 5,208,812 A | 5/1993 | Dudek et al. |
| 5,210,812 A | 5/1993 | Nilsson et al. |
| 5,260,957 A | 11/1993 | Hakimi |
| 5,263,108 A | 11/1993 | Kurokawa et al. |
| 5,267,122 A | 11/1993 | Glover et al. |
| 5,268,971 A | 12/1993 | Nilsson et al. |
| 5,278,690 A | 1/1994 | Vella-Coleiro |
| 5,278,989 A | 1/1994 | Burke et al. |
| 5,280,472 A | 1/1994 | Gilhousen et al. |
| 5,299,947 A | 4/1994 | Barnard |
| 5,301,056 A | 4/1994 | O'Neill |
| 5,325,223 A | 6/1994 | Bears |
| 5,339,058 A | 8/1994 | Lique |
| 5,339,184 A | 8/1994 | Tang |
| 5,343,320 A | 8/1994 | Anderson |
| 5,377,035 A | 12/1994 | Wang et al. |
| 5,379,455 A | 1/1995 | Koschek |
| 5,381,459 A | 1/1995 | Lappington |
| 5,396,224 A | 3/1995 | Dukes et al. |
| 5,400,391 A | 3/1995 | Emura et al. |
| 5,420,863 A | 5/1995 | Taketsugu et al. |
| 5,424,864 A | 6/1995 | Emura |
| 5,444,564 A | 8/1995 | Newberg |
| 5,457,557 A | 10/1995 | Zarem et al. |
| 5,459,727 A | 10/1995 | Vannucci |
| 5,469,523 A | 11/1995 | Blew et al. |
| 5,502,446 A | 3/1996 | Denninger |
| 5,519,830 A | 5/1996 | Opoczynski |
| 5,543,000 A | 8/1996 | Lique |
| 5,546,443 A | 8/1996 | Raith |
| 5,557,698 A | 9/1996 | Gareis et al. |
| 5,574,815 A | 11/1996 | Kneeland |
| 5,583,517 A | 12/1996 | Yokev et al. |
| 5,598,288 A | 1/1997 | Collar |
| 5,606,725 A | 2/1997 | Hart |
| 5,615,034 A | 3/1997 | Hori |
| 5,627,879 A | 5/1997 | Russell et al. |
| 5,640,678 A | 6/1997 | Ishikawa et al. |
| 5,644,622 A | 7/1997 | Russell et al. |
| 5,648,961 A | 7/1997 | Ebihara |
| 5,651,081 A | 7/1997 | Blew et al. |
| 5,661,582 A | 8/1997 | Kintis et al. |
| 5,668,562 A | 9/1997 | Cutrer et al. |
| 5,677,974 A | 10/1997 | Elms et al. |
| 5,682,256 A | 10/1997 | Motley et al. |
| 5,694,232 A | 12/1997 | Parsay et al. |
| 5,703,602 A | 12/1997 | Casebolt |
| 5,708,681 A | 1/1998 | Malkemes et al. |
| 5,726,984 A | 3/1998 | Kubler et al. |
| 5,765,099 A | 6/1998 | Georges et al. |
| 5,774,789 A | 6/1998 | van der Kaay et al. |
| 5,790,536 A | 8/1998 | Mahany et al. |
| 5,790,606 A | 8/1998 | Dent |
| 5,793,772 A | 8/1998 | Burke et al. |
| 5,802,173 A | 9/1998 | Hamilton-Piercy et al. |
| 5,802,473 A | 9/1998 | Rutledge et al. |
| 5,805,975 A | 9/1998 | Green, Sr. et al. |
| 5,805,983 A | 9/1998 | Naidu et al. |
| 5,809,395 A | 9/1998 | Hamilton-Piercy et al. |
| 5,809,422 A | 9/1998 | Raleigh et al. |
| 5,809,431 A | 9/1998 | Bustamante et al. |
| 5,812,296 A | 9/1998 | Tarusawa et al. |
| 5,818,619 A | 10/1998 | Medved et al. |
| 5,818,883 A | 10/1998 | Smith et al. |
| 5,821,510 A | 10/1998 | Cohen et al. |
| 5,825,651 A | 10/1998 | Gupta et al. |
| 5,828,658 A | 10/1998 | Ottersten et al. |
| 5,832,379 A | 11/1998 | Mallinckrodt |
| 5,835,857 A | 11/1998 | Otten |
| 5,838,474 A | 11/1998 | Stilling |
| 5,839,052 A | 11/1998 | Dean et al. |
| 5,852,651 A | 12/1998 | Fischer et al. |
| 5,854,986 A | 12/1998 | Dorren et al. |
| 5,859,719 A | 1/1999 | Dentai et al. |
| 5,862,460 A | 1/1999 | Rich |
| 5,867,485 A | 2/1999 | Chambers et al. |
| 5,867,763 A | 2/1999 | Dean et al. |
| 5,881,200 A | 3/1999 | Burt |
| 5,883,882 A | 3/1999 | Schwartz |
| 5,896,568 A | 4/1999 | Tseng et al. |
| 5,903,834 A | 5/1999 | Wallstedt et al. |
| 5,910,776 A | 6/1999 | Black |
| 5,913,003 A | 6/1999 | Arroyo et al. |
| 5,917,636 A | 6/1999 | Wake et al. |
| 5,930,682 A | 7/1999 | Schwartz et al. |
| 5,936,754 A | 8/1999 | Ariyavisitakul et al. |
| 5,943,372 A | 8/1999 | Gans et al. |
| 5,946,622 A | 8/1999 | Bojeryd |
| 5,949,564 A | 9/1999 | Wake |
| 5,953,670 A | 9/1999 | Newson |
| 5,959,531 A | 9/1999 | Gallagher, III et al. |
| 5,960,344 A | 9/1999 | Mahany |
| 5,969,837 A | 10/1999 | Farber et al. |
| 5,983,070 A | 11/1999 | Georges et al. |
| 5,987,303 A | 11/1999 | Dutta et al. |
| 5,995,832 A | 11/1999 | Mallinckrodt |
| 6,005,884 A | 12/1999 | Cook et al. |
| 6,006,069 A | 12/1999 | Langston et al. |
| 6,006,105 A | 12/1999 | Rostoker et al. |
| 6,011,980 A | 1/2000 | Nagano et al. |
| 6,014,546 A | 1/2000 | Georges et al. |
| 6,016,426 A | 1/2000 | Bodell |
| 6,023,625 A | 2/2000 | Myers, Jr. |
| 6,037,898 A | 3/2000 | Parish et al. |
| 6,049,705 A | 4/2000 | Xue |
| 6,061,161 A | 5/2000 | Yang et al. |
| 6,069,721 A | 5/2000 | Oh et al. |
| 6,088,381 A | 7/2000 | Myers, Jr. |
| 6,112,086 A | 8/2000 | Wala |
| 6,118,767 A | 9/2000 | Shen et al. |
| 6,122,529 A | 9/2000 | Sabat, Jr. et al. |
| 6,127,917 A | 10/2000 | Tuttle |
| 6,128,470 A | 10/2000 | Naidu et al. |
| 6,128,477 A | 10/2000 | Freed |

(56) References Cited

U.S. PATENT DOCUMENTS

| | | |
|---|---|---|
| 6,148,041 A | 11/2000 | Dent |
| 6,150,921 A | 11/2000 | Werb et al. |
| 6,157,810 A | 12/2000 | Georges et al. |
| 6,192,216 B1 | 2/2001 | Sabat, Jr. et al. |
| 6,194,968 B1 | 2/2001 | Winslow |
| 6,198,432 B1 | 3/2001 | Janky |
| 6,212,397 B1 | 4/2001 | Langston et al. |
| 6,222,503 B1 | 4/2001 | Gietema |
| 6,223,201 B1 | 4/2001 | Reznak |
| 6,232,870 B1 | 5/2001 | Garber et al. |
| 6,236,789 B1 | 5/2001 | Fitz |
| 6,236,863 B1 | 5/2001 | Waldroup et al. |
| 6,240,274 B1 | 5/2001 | Izadpanah |
| 6,268,946 B1 | 7/2001 | Larkin et al. |
| 6,275,990 B1 | 8/2001 | Dapper et al. |
| 6,279,158 B1 | 8/2001 | Geile et al. |
| 6,286,163 B1 | 9/2001 | Trimble |
| 6,292,673 B1 | 9/2001 | Maeda et al. |
| 6,295,451 B1 | 9/2001 | Mimura |
| 6,301,240 B1 | 10/2001 | Slabinski et al. |
| 6,307,869 B1 | 10/2001 | Pawelski |
| 6,308,085 B1 | 10/2001 | Shoki |
| 6,314,163 B1 | 11/2001 | Acampora |
| 6,317,599 B1 | 11/2001 | Rappaport et al. |
| 6,323,980 B1 | 11/2001 | Bloom |
| 6,324,391 B1 | 11/2001 | Bodell |
| 6,330,241 B1 | 12/2001 | Fort |
| 6,330,244 B1 | 12/2001 | Swartz et al. |
| 6,334,219 B1 | 12/2001 | Hill et al. |
| 6,336,021 B1 | 1/2002 | Nukada |
| 6,336,042 B1 | 1/2002 | Dawson et al. |
| 6,337,754 B1 | 1/2002 | Imajo |
| 6,340,932 B1 | 1/2002 | Rodgers et al. |
| 6,353,406 B1 | 3/2002 | Lanzl et al. |
| 6,353,600 B1 | 3/2002 | Schwartz et al. |
| 6,359,714 B1 | 3/2002 | Imajo |
| 6,370,203 B1 | 4/2002 | Boesch et al. |
| 6,374,078 B1 | 4/2002 | Williams et al. |
| 6,374,124 B1 | 4/2002 | Slabinski |
| 6,389,010 B1 | 5/2002 | Kubler et al. |
| 6,400,318 B1 | 6/2002 | Kasami et al. |
| 6,400,418 B1 | 6/2002 | Wakabayashi |
| 6,404,775 B1 | 6/2002 | Leslie et al. |
| 6,405,018 B1 | 6/2002 | Reudink et al. |
| 6,405,058 B2 | 6/2002 | Bobier |
| 6,405,308 B1 | 6/2002 | Gupta et al. |
| 6,414,624 B2 | 7/2002 | Endo et al. |
| 6,415,132 B1 | 7/2002 | Sabat, Jr. |
| 6,421,327 B1 | 7/2002 | Lundby et al. |
| 6,438,301 B1 | 8/2002 | Johnson et al. |
| 6,438,371 B1 | 8/2002 | Fujise et al. |
| 6,448,558 B1 | 9/2002 | Greene |
| 6,452,915 B1 | 9/2002 | Jorgensen |
| 6,459,519 B1 | 10/2002 | Sasai et al. |
| 6,459,989 B1 | 10/2002 | Kirkpatrick et al. |
| 6,477,154 B1 | 11/2002 | Cheong et al. |
| 6,480,702 B1 | 11/2002 | Sabat, Jr. |
| 6,486,907 B1 | 11/2002 | Farber et al. |
| 6,496,290 B1 | 12/2002 | Lee |
| 6,501,965 B1 | 12/2002 | Lucidarme |
| 6,504,636 B1 | 1/2003 | Seto et al. |
| 6,504,831 B1 | 1/2003 | Greenwood et al. |
| 6,512,478 B1 | 1/2003 | Chien |
| 6,519,395 B1 | 2/2003 | Bevan et al. |
| 6,519,449 B1 | 2/2003 | Zhang et al. |
| 6,525,855 B1 | 2/2003 | Westbrook et al. |
| 6,535,330 B1 | 3/2003 | Lelic et al. |
| 6,535,720 B1 | 3/2003 | Martin et al. |
| 6,556,551 B1 | 4/2003 | Schwartz |
| 6,577,794 B1 | 6/2003 | Currie et al. |
| 6,577,801 B2 | 6/2003 | Broderick et al. |
| 6,580,393 B2 | 6/2003 | Holt |
| 6,580,402 B2 | 6/2003 | Navarro et al. |
| 6,580,905 B1 | 6/2003 | Naidu et al. |
| 6,580,918 B1 | 6/2003 | Leickel et al. |
| 6,583,763 B2 | 6/2003 | Judd |
| 6,587,514 B1 | 7/2003 | Wright et al. |
| 6,594,496 B2 | 7/2003 | Schwartz |
| 6,597,325 B2 | 7/2003 | Judd et al. |
| 6,598,009 B2 | 7/2003 | Yang |
| 6,606,430 B2 | 8/2003 | Bartur et al. |
| 6,615,074 B2 | 9/2003 | Mickle et al. |
| 6,628,732 B1 | 9/2003 | Takaki |
| 6,634,811 B1 | 10/2003 | Gertel et al. |
| 6,636,747 B2 | 10/2003 | Harada et al. |
| 6,640,103 B1 | 10/2003 | Inman et al. |
| 6,643,437 B1 | 11/2003 | Park |
| 6,652,158 B2 | 11/2003 | Bartur et al. |
| 6,654,590 B2 | 11/2003 | Boros et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,665,308 B1 | 12/2003 | Rakib et al. |
| 6,670,930 B2 | 12/2003 | Navarro |
| 6,675,294 B1 | 1/2004 | Gupta et al. |
| 6,678,509 B2 | 1/2004 | Skarman et al. |
| 6,687,437 B1 | 2/2004 | Starnes et al. |
| 6,690,328 B2 | 2/2004 | Judd |
| 6,696,917 B1 | 2/2004 | Heitner et al. |
| 6,697,603 B1 | 2/2004 | Lovinggood et al. |
| 6,704,298 B1 | 3/2004 | Matsumiya et al. |
| 6,704,545 B1 | 3/2004 | Wala |
| 6,710,366 B1 | 3/2004 | Lee et al. |
| 6,714,800 B2 | 3/2004 | Johnson et al. |
| 6,731,880 B2 | 5/2004 | Westbrook et al. |
| 6,745,013 B1 | 6/2004 | Porter et al. |
| 6,758,913 B1 | 7/2004 | Tunney et al. |
| 6,763,226 B1 | 7/2004 | McZeal, Jr. |
| 6,771,862 B2 | 8/2004 | Karnik et al. |
| 6,771,933 B1 | 8/2004 | Eng et al. |
| 6,784,802 B1 | 8/2004 | Stanescu |
| 6,785,558 B1 | 8/2004 | Stratford et al. |
| 6,788,666 B1 | 9/2004 | Linebarger et al. |
| 6,801,767 B1 | 10/2004 | Schwartz et al. |
| 6,807,374 B1 | 10/2004 | Imajo et al. |
| 6,812,824 B1 | 11/2004 | Goldinger et al. |
| 6,812,905 B2 | 11/2004 | Thomas et al. |
| 6,823,174 B1 | 11/2004 | Masenten et al. |
| 6,826,163 B1 | 11/2004 | Mani et al. |
| 6,826,337 B2 | 11/2004 | Linnell |
| 6,836,660 B1 | 12/2004 | Wala |
| 6,836,673 B1 | 12/2004 | Trott |
| 6,842,433 B2 | 1/2005 | West et al. |
| 6,842,459 B1 | 1/2005 | Binder |
| 6,847,856 B1 | 1/2005 | Bohannon |
| 6,850,510 B2 | 2/2005 | Kubler |
| 6,865,390 B2 | 3/2005 | Goss et al. |
| 6,873,823 B2 | 3/2005 | Hasarchi |
| 6,876,056 B2 | 4/2005 | Tilmans et al. |
| 6,879,290 B1 | 4/2005 | Toutain et al. |
| 6,882,311 B2 | 4/2005 | Walker et al. |
| 6,883,710 B2 | 4/2005 | Chung |
| 6,885,344 B2 | 4/2005 | Mohamadi |
| 6,885,846 B1 | 4/2005 | Panasik et al. |
| 6,889,060 B2 | 5/2005 | Fernando et al. |
| 6,895,249 B2 | 5/2005 | Gaal |
| 6,909,399 B1 | 6/2005 | Zegelin et al. |
| 6,914,539 B2 | 7/2005 | Hoctor et al. |
| 6,915,058 B2 | 7/2005 | Pons |
| 6,915,529 B1 | 7/2005 | Suematsu et al. |
| 6,919,858 B2 | 7/2005 | Rofougaran |
| 6,920,330 B2 | 7/2005 | Caronni et al. |
| 6,924,997 B2 | 8/2005 | Chen et al. |
| 6,930,987 B1 | 8/2005 | Fukuda et al. |
| 6,931,183 B2 | 8/2005 | Panak et al. |
| 6,931,659 B1 | 8/2005 | Kinemura |
| 6,933,849 B2 | 8/2005 | Sawyer |
| 6,934,511 B1 | 8/2005 | Lovinggood et al. |
| 6,934,541 B2 | 8/2005 | Miyatani |
| 6,941,112 B2 | 9/2005 | Hasegawa |
| 6,946,989 B2 | 9/2005 | Vavik |
| 6,961,312 B2 | 11/2005 | Kubler et al. |
| 6,963,289 B2 | 11/2005 | Aljadeff et al. |
| 6,963,552 B2 | 11/2005 | Sabat, Jr. et al. |

(56) References Cited

U.S. PATENT DOCUMENTS

| | | |
|---|---|---|
| 6,965,718 B2 | 11/2005 | Koertel |
| 6,967,347 B2 | 11/2005 | Estes et al. |
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 6,977,502 B1 | 12/2005 | Hertz |
| 7,002,511 B1 | 2/2006 | Ammar et al. |
| 7,006,039 B2 | 2/2006 | Miyamoto et al. |
| 7,006,465 B2 | 2/2006 | Toshimitsu et al. |
| 7,013,087 B2 | 3/2006 | Suzuki et al. |
| 7,015,826 B1 | 3/2006 | Chan et al. |
| 7,020,473 B2 | 3/2006 | Splett |
| 7,020,488 B1 | 3/2006 | Bleile et al. |
| 7,023,382 B1 | 4/2006 | Akano |
| 7,024,166 B2 | 4/2006 | Wallace |
| 7,035,512 B2 | 4/2006 | Van Bijsterveld |
| 7,035,671 B2 | 4/2006 | Solum |
| 7,039,399 B2 | 5/2006 | Fischer |
| 7,043,271 B1 | 5/2006 | Seto et al. |
| 7,047,028 B2 | 5/2006 | Cagenius et al. |
| 7,050,017 B2 | 5/2006 | King et al. |
| 7,053,838 B2 | 5/2006 | Judd |
| 7,054,513 B2 | 5/2006 | Herz et al. |
| 7,069,577 B2 | 6/2006 | Geile et al. |
| 7,072,586 B2 | 7/2006 | Aburakawa et al. |
| 7,082,320 B2 | 7/2006 | Kattukaran et al. |
| 7,084,769 B2 | 8/2006 | Bauer et al. |
| 7,092,726 B2 | 8/2006 | Shi et al. |
| 7,093,985 B2 | 8/2006 | Lord et al. |
| 7,103,119 B2 | 9/2006 | Matsuoka et al. |
| 7,103,377 B2 | 9/2006 | Bauman et al. |
| 7,106,931 B2 | 9/2006 | Sutehall et al. |
| 7,110,795 B2 | 9/2006 | Doi |
| 7,114,859 B1 | 10/2006 | Tuohimaa et al. |
| 7,123,939 B1 | 10/2006 | Bird et al. |
| 7,127,176 B2 | 10/2006 | Sasaki |
| 7,142,503 B1 | 11/2006 | Grant et al. |
| 7,142,535 B2 | 11/2006 | Kubler et al. |
| 7,142,619 B2 | 11/2006 | Sommer et al. |
| 7,160,032 B2 | 1/2007 | Nagashima et al. |
| 7,171,244 B2 | 1/2007 | Bauman |
| 7,184,728 B2 | 2/2007 | Solum |
| 7,190,748 B2 | 3/2007 | Kim et al. |
| 7,194,023 B2 | 3/2007 | Norrell et al. |
| 7,199,443 B2 | 4/2007 | Elsharawy |
| 7,200,305 B2 | 4/2007 | Dion et al. |
| 7,200,391 B2 | 4/2007 | Chung et al. |
| 7,228,072 B2 | 6/2007 | Mickelsson et al. |
| 7,250,907 B2 | 7/2007 | Krumm et al. |
| 7,263,293 B2 | 8/2007 | Ommodt et al. |
| 7,269,311 B2 | 9/2007 | Kim et al. |
| 7,280,011 B2 | 10/2007 | Bayar et al. |
| 7,286,843 B2 | 10/2007 | Scheck |
| 7,286,854 B2 | 10/2007 | Ferrato et al. |
| 7,295,119 B2 | 11/2007 | Rappaport et al. |
| 7,310,430 B1 | 12/2007 | Mallya et al. |
| 7,313,415 B2 | 12/2007 | Wake et al. |
| 7,315,735 B2 | 1/2008 | Graham |
| 7,324,730 B2 | 1/2008 | Varkey et al. |
| 7,343,164 B2 | 3/2008 | Kallstenius |
| 7,348,843 B1 | 3/2008 | Qiu et al. |
| 7,349,633 B2 | 3/2008 | Lee et al. |
| 7,359,408 B2 | 4/2008 | Kim |
| 7,359,674 B2 | 4/2008 | Markki et al. |
| 7,366,150 B2 | 4/2008 | Lee et al. |
| 7,366,151 B2 | 4/2008 | Kubler et al. |
| 7,369,526 B2 | 5/2008 | Lechleider et al. |
| 7,379,669 B2 | 5/2008 | Kim |
| 7,388,892 B2 | 6/2008 | Nishiyama et al. |
| 7,392,025 B2 | 6/2008 | Rooyen et al. |
| 7,392,029 B2 | 6/2008 | Pronkine |
| 7,394,883 B2 | 7/2008 | Funakubo et al. |
| 7,403,156 B2 | 7/2008 | Coppi et al. |
| 7,409,159 B2 | 8/2008 | Izadpanah |
| 7,412,224 B2 | 8/2008 | Kotola et al. |
| 7,424,228 B1 | 9/2008 | Williams et al. |
| 7,429,951 B2 | 9/2008 | Kennedy, Jr. et al. |
| 7,442,679 B2 | 10/2008 | Stolte et al. |
| 7,444,051 B2 | 10/2008 | Tatat et al. |
| 7,450,853 B2 | 11/2008 | Kim et al. |
| 7,450,854 B2 | 11/2008 | Lee et al. |
| 7,451,365 B2 | 11/2008 | Wang et al. |
| 7,454,222 B2 | 11/2008 | Huang et al. |
| 7,460,507 B2 | 12/2008 | Kubler et al. |
| 7,460,829 B2 | 12/2008 | Utsumi et al. |
| 7,460,831 B2 | 12/2008 | Hasarchi |
| 7,466,925 B2 | 12/2008 | Iannelli |
| 7,469,105 B2 | 12/2008 | Wake et al. |
| 7,477,597 B2 | 1/2009 | Segel |
| 7,483,504 B2 | 1/2009 | Shapira et al. |
| 7,483,711 B2 | 1/2009 | Burchfiel |
| 7,496,070 B2 | 2/2009 | Vesuna |
| 7,496,384 B2 | 2/2009 | Seto et al. |
| 7,505,747 B2 | 3/2009 | Solum |
| 7,512,419 B2 | 3/2009 | Solum |
| 7,522,552 B2 | 4/2009 | Fein et al. |
| 7,539,509 B2 | 5/2009 | Bauman et al. |
| 7,542,452 B2 | 6/2009 | Penumetsa |
| 7,546,138 B2 | 6/2009 | Bauman |
| 7,548,138 B2 | 6/2009 | Kamgaing |
| 7,548,695 B2 | 6/2009 | Wake |
| 7,551,641 B2 | 6/2009 | Pirzada et al. |
| 7,557,758 B2 | 7/2009 | Rofougaran |
| 7,580,384 B2 | 8/2009 | Kubler et al. |
| 7,586,861 B2 | 9/2009 | Kubler et al. |
| 7,590,354 B2 | 9/2009 | Sauer et al. |
| 7,593,704 B2 | 9/2009 | Pinel et al. |
| 7,599,420 B2 | 10/2009 | Forenza et al. |
| 7,599,672 B2 | 10/2009 | Shoji et al. |
| 7,610,046 B2 | 10/2009 | Wala |
| 7,627,250 B2 | 12/2009 | George et al. |
| 7,630,690 B2 | 12/2009 | Kaewell, Jr. et al. |
| 7,633,934 B2 | 12/2009 | Kubler et al. |
| 7,639,982 B2 | 12/2009 | Wala |
| 7,646,743 B2 | 1/2010 | Kubler et al. |
| 7,646,777 B2 | 1/2010 | Hicks, III et al. |
| 7,653,397 B2 | 1/2010 | Pernu et al. |
| 7,668,565 B2 | 2/2010 | Ylänen et al. |
| 7,675,936 B2 | 3/2010 | Mizutani et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,697,574 B2 | 4/2010 | Suematsu et al. |
| 7,715,375 B2 | 5/2010 | Kubler et al. |
| 7,715,722 B1 | 5/2010 | Hoke et al. |
| 7,751,374 B2 | 7/2010 | Donovan |
| 7,751,838 B2 | 7/2010 | Ramesh et al. |
| 7,760,703 B2 | 7/2010 | Kubler et al. |
| 7,768,951 B2 | 8/2010 | Kubler et al. |
| 7,773,573 B2 | 8/2010 | Chung et al. |
| 7,778,603 B2 | 8/2010 | Palin et al. |
| 7,787,823 B2 | 8/2010 | George et al. |
| 7,787,854 B2 | 8/2010 | Conyers et al. |
| 7,809,012 B2 | 10/2010 | Ruuska et al. |
| 7,812,766 B2 | 10/2010 | Leblanc et al. |
| 7,812,775 B2 | 10/2010 | Babakhani et al. |
| 7,817,958 B2 | 10/2010 | Scheinert et al. |
| 7,817,969 B2 | 10/2010 | Castaneda et al. |
| 7,835,328 B2 | 11/2010 | Stephens et al. |
| 7,844,273 B2 | 11/2010 | Scheinert |
| 7,848,316 B2 | 12/2010 | Kubler et al. |
| 7,848,731 B1 | 12/2010 | Dianda et al. |
| 7,848,770 B2 | 12/2010 | Scheinert |
| 7,853,234 B2 | 12/2010 | Afsahi |
| 7,870,321 B2 | 1/2011 | Rofougaran |
| 7,880,677 B2 | 2/2011 | Rofougaran et al. |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,907,972 B2 | 3/2011 | Walton et al. |
| 7,912,043 B2 | 3/2011 | Kubler et al. |
| 7,912,506 B2 | 3/2011 | Lovberg et al. |
| 7,916,706 B2 | 3/2011 | Kubler et al. |

(56) References Cited

U.S. PATENT DOCUMENTS

| | | |
|---|---|---|
| 7,917,177 B2 | 3/2011 | Bauman |
| 7,920,553 B2 | 4/2011 | Kubler et al. |
| 7,920,858 B2 | 4/2011 | Sabat, Jr. et al. |
| 7,924,783 B1 | 4/2011 | Mahany et al. |
| 7,929,940 B1 | 4/2011 | Dianda et al. |
| 7,936,713 B2 | 5/2011 | Kubler et al. |
| 7,948,897 B2 | 5/2011 | Stuart et al. |
| 7,949,364 B2 | 5/2011 | Kasslin et al. |
| 7,957,777 B1 | 6/2011 | Vu et al. |
| 7,962,111 B2 | 6/2011 | Solum |
| 7,969,009 B2 | 6/2011 | Chandrasekaran |
| 7,969,911 B2 | 6/2011 | Mahany et al. |
| 7,990,925 B2 | 8/2011 | Tinnakornsrisuphap et al. |
| 7,996,020 B1 | 8/2011 | Chhabra |
| 8,018,907 B2 | 9/2011 | Kubler et al. |
| 8,023,886 B2 | 9/2011 | Rofougaran |
| 8,027,656 B2 | 9/2011 | Rofougaran et al. |
| 8,036,308 B2 | 10/2011 | Rofougaran |
| 8,082,353 B2 | 12/2011 | Huber et al. |
| 8,086,192 B2 | 12/2011 | Rofougaran et al. |
| 8,107,464 B2 | 1/2012 | Schmidt et al. |
| 8,174,428 B2 | 5/2012 | Wegener |
| 8,274,929 B2 | 9/2012 | Schmidt et al. |
| 8,275,265 B2 | 9/2012 | Kobyakov et al. |
| 8,279,800 B2 | 10/2012 | Schmidt et al. |
| 8,310,963 B2 | 11/2012 | Singh |
| 8,346,091 B2 | 1/2013 | Kummetz et al. |
| 8,422,884 B2 | 4/2013 | Mao |
| 8,467,823 B2 | 6/2013 | Seki et al. |
| 8,548,330 B2 | 10/2013 | Berlin et al. |
| 8,548,526 B2 | 10/2013 | Schmidt et al. |
| 8,583,100 B2 | 11/2013 | Koziy et al. |
| 8,599,794 B2 | 12/2013 | Ahmadi ........................ 370/331 |
| 8,634,766 B2 | 1/2014 | Hobbs et al. |
| 8,676,214 B2 | 3/2014 | Fischer et al. |
| 8,681,917 B2 | 3/2014 | McAllister et al. |
| 8,693,342 B2 | 4/2014 | Uyehara et al. |
| 8,694,034 B2 | 4/2014 | Notargiacomo |
| 8,699,982 B2 | 4/2014 | Singh |
| 8,737,300 B2 | 5/2014 | Stapleton et al. |
| 8,792,933 B2 | 7/2014 | Chen |
| 8,873,585 B2 | 10/2014 | Oren et al. |
| 8,908,607 B2 | 12/2014 | Kummetz et al. |
| 8,913,892 B2 | 12/2014 | Berlin et al. |
| 8,948,816 B2 | 2/2015 | Fischer et al. |
| 8,958,789 B2 | 2/2015 | Bauman et al. |
| 8,976,067 B2 | 3/2015 | Fischer |
| 9,001,811 B2 | 4/2015 | Wala et al. |
| 9,130,613 B2 | 9/2015 | Oren et al. |
| 2001/0036199 A1 | 11/2001 | Terry |
| 2002/0003645 A1 | 1/2002 | Kim et al. |
| 2002/0009070 A1 | 1/2002 | Lindsay et al. |
| 2002/0012495 A1 | 1/2002 | Sasai et al. |
| 2002/0048071 A1 | 4/2002 | Suzuki et al. |
| 2002/0051434 A1 | 5/2002 | Ozluturk et al. |
| 2002/0075906 A1 | 6/2002 | Cole et al. |
| 2002/0085643 A1 | 7/2002 | Kitchener et al. |
| 2002/0092347 A1 | 7/2002 | Niekerk et al. |
| 2002/0111149 A1 | 8/2002 | Shoki |
| 2002/0111192 A1 | 8/2002 | Thomas et al. |
| 2002/0114038 A1 | 8/2002 | Arnon et al. |
| 2002/0123365 A1 | 9/2002 | Thorson et al. |
| 2002/0126967 A1 | 9/2002 | Panak et al. |
| 2002/0128009 A1 | 9/2002 | Boch et al. |
| 2002/0130778 A1 | 9/2002 | Nicholson |
| 2002/0181668 A1 | 12/2002 | Masoian et al. |
| 2002/0190845 A1 | 12/2002 | Moore |
| 2003/0002604 A1 | 1/2003 | Fifield et al. |
| 2003/0007214 A1 | 1/2003 | Aburakawa et al. |
| 2003/0016418 A1 | 1/2003 | Westbrook et al. |
| 2003/0045284 A1 | 3/2003 | Copley et al. |
| 2003/0078074 A1 | 4/2003 | Sesay et al. |
| 2003/0112826 A1 | 6/2003 | Smith et al. |
| 2003/0141962 A1 | 7/2003 | Barink |
| 2003/0161637 A1 | 8/2003 | Yamamoto et al. |
| 2003/0165287 A1 | 9/2003 | Krill et al. |
| 2003/0174099 A1 | 9/2003 | Bauer et al. |
| 2003/0209601 A1 | 11/2003 | Chung |
| 2004/0001719 A1 | 1/2004 | Sasaki |
| 2004/0008114 A1 | 1/2004 | Sawyer |
| 2004/0017785 A1 | 1/2004 | Zelst |
| 2004/0037565 A1 | 2/2004 | Young et al. |
| 2004/0041714 A1 | 3/2004 | Forster |
| 2004/0043764 A1 | 3/2004 | Bigham et al. |
| 2004/0047313 A1 | 3/2004 | Rumpf et al. |
| 2004/0068751 A1 | 4/2004 | Basawapatna et al. |
| 2004/0078151 A1 | 4/2004 | Aljadeff et al. |
| 2004/0095907 A1 | 5/2004 | Agee et al. |
| 2004/0100930 A1 | 5/2004 | Shapira et al. |
| 2004/0102196 A1 | 5/2004 | Weckstrom et al. |
| 2004/0105435 A1 | 6/2004 | Morioka |
| 2004/0126068 A1 | 7/2004 | Van Bijsterveld |
| 2004/0126107 A1 | 7/2004 | Jay et al. |
| 2004/0139477 A1 | 7/2004 | Russell et al. |
| 2004/0146020 A1 | 7/2004 | Kubler et al. |
| 2004/0149736 A1 | 8/2004 | Clothier |
| 2004/0151164 A1 | 8/2004 | Kubler et al. |
| 2004/0151503 A1 | 8/2004 | Kashima et al. |
| 2004/0157623 A1 | 8/2004 | Splett |
| 2004/0160912 A1 | 8/2004 | Kubler et al. |
| 2004/0160913 A1 | 8/2004 | Kubler et al. |
| 2004/0162084 A1 | 8/2004 | Wang |
| 2004/0162115 A1 | 8/2004 | Smith et al. |
| 2004/0162116 A1 | 8/2004 | Han et al. |
| 2004/0164902 A1 | 8/2004 | Karlsson et al. |
| 2004/0165568 A1 | 8/2004 | Weinstein |
| 2004/0165573 A1 | 8/2004 | Kubler et al. |
| 2004/0175173 A1 | 9/2004 | Deas |
| 2004/0196404 A1 | 10/2004 | Loheit et al. |
| 2004/0202257 A1 | 10/2004 | Mehta et al. |
| 2004/0203703 A1 | 10/2004 | Fischer |
| 2004/0203704 A1 | 10/2004 | Ommodt et al. |
| 2004/0203846 A1 | 10/2004 | Caronni et al. |
| 2004/0204109 A1 | 10/2004 | Hoppenstein |
| 2004/0208526 A1 | 10/2004 | Mibu |
| 2004/0208643 A1 | 10/2004 | Roberts et al. |
| 2004/0218873 A1 | 11/2004 | Nagashima et al. |
| 2004/0233877 A1 | 11/2004 | Lee et al. |
| 2004/0258105 A1 | 12/2004 | Spathas et al. |
| 2005/0041693 A1 | 2/2005 | Priotti |
| 2005/0052287 A1 | 3/2005 | Whitesmith et al. |
| 2005/0058451 A1 | 3/2005 | Ross |
| 2005/0068179 A1 | 3/2005 | Roesner |
| 2005/0076982 A1 | 4/2005 | Metcalf et al. |
| 2005/0078006 A1 | 4/2005 | Hutchins |
| 2005/0093679 A1 | 5/2005 | Zai et al. |
| 2005/0099343 A1 | 5/2005 | Asrani et al. |
| 2005/0116821 A1 | 6/2005 | Wilsey et al. |
| 2005/0123232 A1 | 6/2005 | Piede et al. |
| 2005/0141545 A1 | 6/2005 | Fein et al. |
| 2005/0143077 A1 | 6/2005 | Charbonneau |
| 2005/0147071 A1 | 7/2005 | Karaoguz et al. |
| 2005/0148306 A1 | 7/2005 | Hiddink |
| 2005/0159108 A1 | 7/2005 | Fletcher |
| 2005/0174236 A1 | 8/2005 | Brookner |
| 2005/0176458 A1 | 8/2005 | Shklarsky et al. |
| 2005/0201761 A1 | 9/2005 | Bartur et al. |
| 2005/0219050 A1 | 10/2005 | Martin |
| 2005/0224585 A1 | 10/2005 | Durrant et al. |
| 2005/0226625 A1 | 10/2005 | Wake et al. |
| 2005/0232636 A1 | 10/2005 | Durrant et al. |
| 2005/0242188 A1 | 11/2005 | Vesuna |
| 2005/0252971 A1 | 11/2005 | Howarth et al. |
| 2005/0266797 A1 | 12/2005 | Utsumi et al. |
| 2005/0266854 A1 | 12/2005 | Niiho et al. |
| 2005/0269930 A1 | 12/2005 | Shimizu et al. |
| 2005/0271396 A1 | 12/2005 | Iannelli |
| 2005/0272439 A1 | 12/2005 | Picciriello et al. |
| 2006/0002326 A1 | 1/2006 | Vesuna |
| 2006/0014548 A1 | 1/2006 | Bolin |
| 2006/0017633 A1 | 1/2006 | Pronkine |
| 2006/0025101 A1 | 2/2006 | Li |
| 2006/0028352 A1 | 2/2006 | McNamara et al. |
| 2006/0045054 A1 | 3/2006 | Utsumi et al. |

(56) References Cited

U.S. PATENT DOCUMENTS

| | | |
|---|---|---|
| 2006/0046662 A1 | 3/2006 | Moulsley et al. |
| 2006/0056283 A1 | 3/2006 | Anikhindi et al. |
| 2006/0056327 A1 | 3/2006 | Coersmeier |
| 2006/0062579 A1 | 3/2006 | Kim et al. |
| 2006/0063494 A1 | 3/2006 | Zhang et al. |
| 2006/0094470 A1 | 5/2006 | Wake et al. |
| 2006/0104643 A1 | 5/2006 | Lee et al. |
| 2006/0120395 A1 | 6/2006 | Xing et al. |
| 2006/0128425 A1 | 6/2006 | Rooyen |
| 2006/0159388 A1 | 7/2006 | Kawase et al. |
| 2006/0182446 A1 | 8/2006 | Kim et al. |
| 2006/0182449 A1 | 8/2006 | Iannelli et al. |
| 2006/0189280 A1 | 8/2006 | Goldberg |
| 2006/0189354 A1 | 8/2006 | Lee et al. |
| 2006/0203836 A1 | 9/2006 | Kim |
| 2006/0217132 A1 | 9/2006 | Drummond-Murray et al. |
| 2006/0223439 A1 | 10/2006 | Pinel et al. |
| 2006/0233506 A1 | 10/2006 | Noonan et al. |
| 2006/0239630 A1 | 10/2006 | Hase et al. |
| 2006/0262014 A1 | 11/2006 | Shemesh et al. |
| 2006/0268738 A1 | 11/2006 | Goerke et al. |
| 2006/0274704 A1 | 12/2006 | Desai et al. |
| 2006/0276227 A1 | 12/2006 | Dravida |
| 2007/0008939 A1 | 1/2007 | Fischer |
| 2007/0009266 A1 | 1/2007 | Bothwell |
| 2007/0054682 A1 | 3/2007 | Fanning et al. |
| 2007/0058978 A1 | 3/2007 | Lee et al. |
| 2007/0060045 A1 | 3/2007 | Prautzsch |
| 2007/0060055 A1 | 3/2007 | Desai et al. |
| 2007/0071128 A1 | 3/2007 | Meir et al. |
| 2007/0072646 A1 | 3/2007 | Kuwahara et al. |
| 2007/0076649 A1 | 4/2007 | Lin et al. |
| 2007/0093273 A1 | 4/2007 | Cai |
| 2007/0099578 A1 | 5/2007 | Adeney et al. |
| 2007/0104165 A1 | 5/2007 | Hanaoka et al. |
| 2007/0135169 A1 | 6/2007 | Sychaleun et al. |
| 2007/0149250 A1 | 6/2007 | Crozzoli et al. |
| 2007/0155314 A1 | 7/2007 | Mohebbi |
| 2007/0166042 A1 | 7/2007 | Seeds et al. |
| 2007/0173288 A1 | 7/2007 | Skarby et al. |
| 2007/0182626 A1 | 8/2007 | Samavati et al. |
| 2007/0184841 A1 | 8/2007 | Choi et al. |
| 2007/0224954 A1 | 9/2007 | Gopi |
| 2007/0243899 A1 | 10/2007 | Hermel et al. |
| 2007/0248358 A1 | 10/2007 | Sauer |
| 2007/0253714 A1 | 11/2007 | Seeds et al. |
| 2007/0257796 A1 | 11/2007 | Easton et al. |
| 2007/0264009 A1 | 11/2007 | Sabat, Jr. et al. |
| 2007/0264011 A1 | 11/2007 | Sone et al. |
| 2007/0268846 A1 | 11/2007 | Proctor et al. |
| 2007/0274279 A1 | 11/2007 | Wood et al. |
| 2007/0280370 A1 | 12/2007 | Liu |
| 2007/0292143 A1 | 12/2007 | Yu et al. |
| 2007/0297005 A1 | 12/2007 | Montierth et al. |
| 2008/0002652 A1 | 1/2008 | Gupta et al. |
| 2008/0005219 A1 | 1/2008 | Nabar et al. |
| 2008/0007453 A1 | 1/2008 | Vassilakis et al. |
| 2008/0008134 A1* | 1/2008 | Satou ............... H04B 7/063 370/334 |
| 2008/0013473 A1 | 1/2008 | Proctor, Jr. et al. |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0026765 A1 | 1/2008 | Charbonneau |
| 2008/0031628 A1 | 2/2008 | Dragas et al. |
| 2008/0043714 A1 | 2/2008 | Pernu |
| 2008/0056167 A1 | 3/2008 | Kim et al. |
| 2008/0058018 A1 | 3/2008 | Scheinert |
| 2008/0063397 A1 | 3/2008 | Hu et al. |
| 2008/0070502 A1 | 3/2008 | George et al. |
| 2008/0080863 A1 | 4/2008 | Sauer et al. |
| 2008/0098203 A1 | 4/2008 | Master et al. |
| 2008/0107202 A1 | 5/2008 | Lee et al. |
| 2008/0118014 A1 | 5/2008 | Reunamaki et al. |
| 2008/0119198 A1 | 5/2008 | Hettstedt et al. |
| 2008/0124086 A1 | 5/2008 | Matthews |
| 2008/0124087 A1 | 5/2008 | Hartmann et al. |
| 2008/0129594 A1 | 6/2008 | Pera et al. |
| 2008/0129634 A1 | 6/2008 | Pera et al. |
| 2008/0134194 A1 | 6/2008 | Liu |
| 2008/0145061 A1 | 6/2008 | Lee et al. |
| 2008/0150514 A1 | 6/2008 | Codreanu et al. |
| 2008/0194226 A1 | 8/2008 | Rivas et al. |
| 2008/0207253 A1 | 8/2008 | Jaakkola et al. |
| 2008/0212969 A1 | 9/2008 | Fasshauer et al. |
| 2008/0219670 A1 | 9/2008 | Kim et al. |
| 2008/0232799 A1 | 9/2008 | Kim |
| 2008/0233967 A1* | 9/2008 | Montojo ............ H04W 72/082 455/452.2 |
| 2008/0247716 A1 | 10/2008 | Thomas et al. |
| 2008/0253280 A1 | 10/2008 | Tang et al. |
| 2008/0253351 A1 | 10/2008 | Pernu et al. |
| 2008/0253773 A1 | 10/2008 | Zheng |
| 2008/0260388 A1 | 10/2008 | Kim et al. |
| 2008/0261656 A1 | 10/2008 | Bella et al. |
| 2008/0268766 A1 | 10/2008 | Narkmon et al. |
| 2008/0268833 A1 | 10/2008 | Huang et al. |
| 2008/0273844 A1 | 11/2008 | Kewitsch |
| 2008/0279137 A1 | 11/2008 | Pernu et al. |
| 2008/0280569 A1 | 11/2008 | Hazani et al. |
| 2008/0291818 A1 | 11/2008 | Leisten |
| 2008/0291830 A1 | 11/2008 | Pernu et al. |
| 2008/0292322 A1 | 11/2008 | Daghighian et al. |
| 2008/0298813 A1 | 12/2008 | Song et al. |
| 2008/0304831 A1 | 12/2008 | Miller, II et al. |
| 2008/0310464 A1 | 12/2008 | Schneider |
| 2008/0310848 A1 | 12/2008 | Yasuda et al. |
| 2008/0311876 A1 | 12/2008 | Leenaerts et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0047023 A1 | 2/2009 | Pescod et al. |
| 2009/0059903 A1 | 3/2009 | Kubler et al. |
| 2009/0061796 A1 | 3/2009 | Arkko et al. |
| 2009/0061939 A1 | 3/2009 | Andersson et al. |
| 2009/0073916 A1 | 3/2009 | Zhang et al. |
| 2009/0087179 A1 | 4/2009 | Underwood et al. |
| 2009/0088071 A1 | 4/2009 | Rofougaran |
| 2009/0092073 A1 | 4/2009 | Doppler et al. |
| 2009/0135078 A1 | 5/2009 | Lindmark et al. |
| 2009/0141780 A1 | 6/2009 | Cruz-Albrecht et al. |
| 2009/0149221 A1 | 6/2009 | Liu et al. |
| 2009/0154621 A1 | 6/2009 | Shapira et al. |
| 2009/0175214 A1 | 7/2009 | Sfar et al. |
| 2009/0180407 A1 | 7/2009 | Sabat et al. |
| 2009/0218407 A1 | 9/2009 | Rofougaran |
| 2009/0218657 A1 | 9/2009 | Rofougaran |
| 2009/0237317 A1 | 9/2009 | Rofougaran |
| 2009/0239521 A1 | 9/2009 | Mohebbi |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0247109 A1 | 10/2009 | Rofougaran |
| 2009/0252136 A1 | 10/2009 | Mahany et al. |
| 2009/0252204 A1 | 10/2009 | Shatara et al. |
| 2009/0252205 A1 | 10/2009 | Rheinfelder et al. |
| 2009/0258652 A1 | 10/2009 | Lambert et al. |
| 2009/0278596 A1 | 11/2009 | Rofougaran et al. |
| 2009/0279593 A1 | 11/2009 | Rofougaran et al. |
| 2009/0285147 A1 | 11/2009 | Subasic et al. |
| 2009/0316609 A1 | 12/2009 | Singh |
| 2010/0002626 A1 | 1/2010 | Schmidt et al. |
| 2010/0027443 A1 | 2/2010 | LoGalbo et al. |
| 2010/0056200 A1 | 3/2010 | Tolonen |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |
| 2010/0142598 A1 | 6/2010 | Murray et al. |
| 2010/0142955 A1 | 6/2010 | Yu et al. |

(56) References Cited

U.S. PATENT DOCUMENTS

| | | |
|---|---|---|
| 2010/0144285 A1 | 6/2010 | Behzad et al. |
| 2010/0148373 A1 | 6/2010 | Chandrasekaran |
| 2010/0156721 A1 | 6/2010 | Alamouti et al. |
| 2010/0159859 A1 | 6/2010 | Rofougaran |
| 2010/0188998 A1 | 7/2010 | Pernu et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225520 A1 | 9/2010 | Mohamadi et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0246541 A9 | 9/2010 | Kim |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0261501 A1 | 10/2010 | Behzad et al. |
| 2010/0265874 A1* | 10/2010 | Palanki .......... H04B 7/2606 370/315 |
| 2010/0284323 A1 | 11/2010 | Tang et al. |
| 2010/0290355 A1 | 11/2010 | Roy et al. |
| 2010/0309049 A1 | 12/2010 | Reunamäki et al. |
| 2010/0311472 A1 | 12/2010 | Rofougaran et al. |
| 2010/0311480 A1 | 12/2010 | Raines et al. |
| 2010/0329161 A1 | 12/2010 | Ylanen et al. |
| 2010/0329166 A1 | 12/2010 | Mahany et al. |
| 2011/0007724 A1 | 1/2011 | Mahany et al. |
| 2011/0007733 A1 | 1/2011 | Kubler et al. |
| 2011/0008042 A1 | 1/2011 | Stewart |
| 2011/0019999 A1 | 1/2011 | George et al. |
| 2011/0021146 A1 | 1/2011 | Pernu |
| 2011/0021224 A1 | 1/2011 | Koskinen et al. |
| 2011/0026932 A1 | 2/2011 | Yeh et al. |
| 2011/0065450 A1 | 3/2011 | Kazmi |
| 2011/0066774 A1 | 3/2011 | Rofougaran |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. |
| 2011/0116572 A1 | 5/2011 | Lee et al. |
| 2011/0122912 A1 | 5/2011 | Benjamin et al. |
| 2011/0126071 A1 | 5/2011 | Han et al. |
| 2011/0135308 A1 | 6/2011 | Tarlazzi et al. |
| 2011/0149879 A1 | 6/2011 | Noriega et al. |
| 2011/0158298 A1 | 6/2011 | Djadi et al. |
| 2011/0182230 A1 | 7/2011 | Ohm et al. |
| 2011/0194475 A1 | 8/2011 | Kim et al. |
| 2011/0200325 A1 | 8/2011 | Kobyakov et al. ............ 398/25 |
| 2011/0201368 A1 | 8/2011 | Faccin et al. |
| 2011/0204504 A1 | 8/2011 | Henderson et al. |
| 2011/0206383 A1 | 8/2011 | Chien et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222616 A1 | 9/2011 | Jiang et al. |
| 2011/0222619 A1 | 9/2011 | Ramamurthi et al. |
| 2011/0223958 A1 | 9/2011 | Chen et al. |
| 2011/0223960 A1 | 9/2011 | Chen et al. |
| 2011/0223961 A1 | 9/2011 | Chen et al. |
| 2011/0227795 A1 | 9/2011 | Lopez et al. |
| 2011/0243201 A1 | 10/2011 | Phillips et al. |
| 2011/0244887 A1 | 10/2011 | Dupray et al. |
| 2011/0256878 A1 | 10/2011 | Zhu et al. |
| 2011/0268033 A1 | 11/2011 | Boldi et al. |
| 2011/0274021 A1 | 11/2011 | He et al. |
| 2011/0281536 A1 | 11/2011 | Lee et al. |
| 2011/0305284 A1 | 12/2011 | Mueck et al. |
| 2012/0002750 A1* | 1/2012 | Hooli .................. H04B 7/0417 375/295 |
| 2012/0046039 A1* | 2/2012 | Hagerman .............. H04B 7/10 455/450 |
| 2012/0087670 A1 | 4/2012 | Han et al. |
| 2012/0140660 A1* | 6/2012 | Kang .................. H04L 1/0077 370/252 |
| 2012/0170542 A1* | 7/2012 | Zangi .................. H04L 5/0007 370/329 |
| 2012/0177026 A1 | 7/2012 | Uyehara et al. |
| 2012/0208581 A1* | 8/2012 | Ishida .................. H04B 7/0691 455/509 |
| 2012/0213111 A1 | 8/2012 | Shimezawa et al. |
| 2012/0243513 A1* | 9/2012 | Fujishima ........... H04W 72/085 370/336 |
| 2012/0314797 A1 | 12/2012 | Kummetz et al. |
| 2012/0327800 A1* | 12/2012 | Kim .................. H04W 72/082 370/252 |
| 2013/0017863 A1 | 1/2013 | Kummetz et al. |
| 2013/0095875 A1 | 4/2013 | Reuven |
| 2013/0101005 A1 | 4/2013 | Aryanfar |
| 2013/0150063 A1 | 6/2013 | Berlin et al. |
| 2013/0195000 A1 | 8/2013 | Shen et al. |
| 2013/0235962 A1 | 9/2013 | O'Keefe et al. |
| 2014/0078920 A1 | 3/2014 | Tandra et al. |
| 2014/0126914 A1 | 5/2014 | Berlin et al. |
| 2014/0211875 A1 | 7/2014 | Berlin et al. |
| 2014/0226698 A1 | 8/2014 | Negus et al. |
| 2014/0269859 A1 | 9/2014 | Hanson et al. |
| 2014/0314061 A1 | 10/2014 | Trajkovic et al. |
| 2015/0003565 A1 | 1/2015 | George et al. |
| 2015/0023283 A1* | 1/2015 | Liu ....................... H04W 36/08 370/329 |
| 2015/0098351 A1 | 4/2015 | Zavadsky et al. |
| 2015/0098372 A1 | 4/2015 | Zavadsky et al. |
| 2015/0098419 A1 | 4/2015 | Zavadsky et al. |

FOREIGN PATENT DOCUMENTS

| | | |
|---|---|---|
| CA | 2065090 C | 2/1998 |
| CA | 2242707 A1 | 1/1999 |
| DE | 20104862 U1 | 8/2001 |
| DE | 10249414 A1 | 5/2004 |
| EP | 0355328 A2 | 2/1990 |
| EP | 0477952 A2 | 4/1992 |
| EP | 0477952 A3 | 4/1992 |
| EP | 0709974 A1 | 5/1996 |
| EP | 0461583 B1 | 3/1997 |
| EP | 851618 A2 | 7/1998 |
| EP | 0687400 B1 | 11/1998 |
| EP | 0938204 A1 | 8/1999 |
| EP | 0993124 A2 | 4/2000 |
| EP | 1037411 A2 | 9/2000 |
| EP | 1085684 A2 | 3/2001 |
| EP | 1179895 A1 | 2/2002 |
| EP | 1267447 A1 | 12/2002 |
| EP | 1347584 A2 | 9/2003 |
| EP | 1363352 A1 | 11/2003 |
| EP | 1391897 A1 | 2/2004 |
| EP | 1443687 A1 | 8/2004 |
| EP | 1455550 A2 | 9/2004 |
| EP | 1501206 A1 | 1/2005 |
| EP | 1503451 A1 | 2/2005 |
| EP | 1530316 A1 | 5/2005 |
| EP | 1511203 B1 | 3/2006 |
| EP | 1267447 B1 | 8/2006 |
| EP | 1693974 A1 | 8/2006 |
| EP | 1742388 A1 | 1/2007 |
| EP | 1227605 B1 | 1/2008 |
| EP | 1954019 A1 | 8/2008 |
| EP | 1968250 A1 | 9/2008 |
| EP | 1056226 B1 | 4/2009 |
| EP | 1357683 B1 | 5/2009 |
| EP | 2219310 A1 | 8/2010 |
| GB | 2313020 A | 11/1997 |
| GB | 2323252 A | 9/1998 |
| GB | 2399963 A | 9/2004 |
| GB | 2428149 A | 1/2007 |
| JP | H4189036 A | 7/1992 |
| JP | 05252559 A | 9/1993 |
| JP | 05260018 A | 10/1993 |
| JP | 05327569 A | 12/1993 |
| JP | 05327576 A | 12/1993 |
| JP | 09083450 A | 3/1997 |
| JP | 09162810 A | 6/1997 |

(56) References Cited

FOREIGN PATENT DOCUMENTS

| | | |
|---|---|---|
| JP | 09200840 A | 7/1997 |
| JP | 11068675 A | 3/1999 |
| JP | 2000152300 A | 5/2000 |
| JP | 2000341744 A | 12/2000 |
| JP | 2002264617 A | 9/2002 |
| JP | 2002353813 A | 12/2002 |
| JP | 2003148653 A | 5/2003 |
| JP | 2003172827 A | 6/2003 |
| JP | 2004172734 A | 6/2004 |
| JP | 2004245963 A | 9/2004 |
| JP | 2004247090 A | 9/2004 |
| JP | 2004264901 A | 9/2004 |
| JP | 2004265624 A | 9/2004 |
| JP | 2004317737 A | 11/2004 |
| JP | 2004349184 A | 12/2004 |
| JP | 2005018175 A | 1/2005 |
| JP | 2005087135 A | 4/2005 |
| JP | 2005134125 A | 5/2005 |
| JP | 2007228603 A | 9/2007 |
| JP | 2008172597 A | 7/2008 |
| KR | 20010055088 A | 7/2001 |
| KR | 20110087949 A | 8/2011 |
| WO | 9603823 A1 | 2/1996 |
| WO | 9613102 A1 | 5/1996 |
| WO | 9804054 A1 | 1/1998 |
| WO | 9810600 A1 | 3/1998 |
| WO | 0042721 A1 | 7/2000 |
| WO | 0072475 A1 | 11/2000 |
| WO | 0178434 A1 | 10/2001 |
| WO | 0184760 A1 | 11/2001 |
| WO | 0186755 A2 | 11/2001 |
| WO | 0221183 A1 | 3/2002 |
| WO | 0230141 A1 | 4/2002 |
| WO | 02091618 A1 | 11/2002 |
| WO | 02102102 A1 | 12/2002 |
| WO | 03024027 A1 | 3/2003 |
| WO | 03098175 A1 | 11/2003 |
| WO | 2004030154 A2 | 4/2004 |
| WO | 2004047472 A1 | 6/2004 |
| WO | 2004056019 A1 | 7/2004 |
| WO | 2004059934 A1 | 7/2004 |
| WO | 2004086795 A2 | 10/2004 |
| WO | 2004093471 A2 | 10/2004 |
| WO | 2004107783 A1 | 12/2004 |
| WO | 2005062505 A1 | 7/2005 |
| WO | 2005069203 A2 | 7/2005 |
| WO | 2005073897 A1 | 8/2005 |
| WO | 2005079386 A2 | 9/2005 |
| WO | 2005101701 A2 | 10/2005 |
| WO | 2005111959 A2 | 11/2005 |
| WO | 2006011778 A1 | 2/2006 |
| WO | 2006018592 A1 | 2/2006 |
| WO | 2006019392 A1 | 2/2006 |
| WO | 2006039941 A1 | 4/2006 |
| WO | 2006051262 A1 | 5/2006 |
| WO | 2006060754 A2 | 6/2006 |
| WO | 2006094441 A1 | 9/2006 |
| WO | 2006105185 A2 | 10/2006 |
| WO | 2006133609 A1 | 12/2006 |
| WO | 2006136811 A1 | 12/2006 |
| WO | 2007048427 A1 | 5/2007 |
| WO | 2007075579 A2 | 7/2007 |
| WO | 2007077451 A1 | 7/2007 |
| WO | 2007088561 A1 | 8/2007 |
| WO | 2007091026 A1 | 8/2007 |
| WO | 2007133630 A2 | 11/2007 |
| WO | 2008008249 A2 | 1/2008 |
| WO | 2008027213 A2 | 3/2008 |
| WO | 2008033298 A2 | 3/2008 |
| WO | 2008039830 A2 | 4/2008 |
| WO | 2008116014 A2 | 9/2008 |
| WO | 2006046088 A1 | 5/2009 |
| WO | 2009100395 A1 | 8/2009 |
| WO | 2009100396 A1 | 8/2009 |
| WO | 2009100397 A2 | 8/2009 |
| WO | 2009100398 A2 | 8/2009 |
| WO | 2010087919 A2 | 8/2010 |
| WO | 2010090999 A1 | 8/2010 |
| WO | 2010132739 A1 | 11/2010 |
| WO | 2011005162 A1 | 1/2011 |
| WO | 2011043172 A1 | 4/2011 |
| WO | 2011100095 A1 | 8/2011 |
| WO | 2011112373 A1 | 9/2011 |
| WO | 2011139939 A1 | 11/2011 |
| WO | 2011/158302 A1 | 12/2011 ............... H04B 7/02 |
| WO | 2011160117 A1 | 12/2011 |
| WO | 2012024345 A2 | 2/2012 |
| WO | 2012054553 A1 | 4/2012 |
| WO | 2012/148256 A1 | 11/2012 ............ H04W 36/00 |
| WO | 2012148938 A1 | 11/2012 |
| WO | 2012148940 A1 | 11/2012 |
| WO | WO2012/148256 * | 11/2012 ............ H04W 36/00 |
| WO | 2012170865 A2 | 12/2012 |
| WO | 2013009283 A1 | 1/2013 |
| WO | 2013009835 A1 | 1/2013 |
| WO | 2014070236 A1 | 5/2014 |
| WO | 2014082070 A1 | 5/2014 |
| WO | 2014082072 A1 | 5/2014 |
| WO | 2014082075 A1 | 5/2014 |
| WO | 2014144314 A1 | 9/2014 |
| WO | 2015054162 A1 | 4/2015 |
| WO | 2015054164 A1 | 4/2015 |
| WO | 2015054165 A1 | 4/2015 |

OTHER PUBLICATIONS

L. Tarlazzi et. al., "Characterization of an Interleaved F-DAS MIMO Indoor Propagation Channel," 2010 Loughborough Antennas & Propagation Conference, pp. 505-508, 2010.

E. M. Vitucci, et. al., "Analysis of the Performance of LTE Systems in an Interleaved F-DAS MIMO Indoor Environment," Proceedings of the $5^{th}$ European conference on Antennas and Propogation (EUCAP), pp. 2184-2186.

R. Iberon-Fernandez et. al., "Comparison between measurements and simulations of conventional and distributed MIMO systems," in IEEE Antennas and Wireless Poropogation Letters, vol. 7, pp. 546-549, 2008.

Wei, et al., "Cooperative communications with partial channel-state information in multiuser MIMO systems." AEU Journal of Electronics and Communications, vol. 65, No. 4, Apr. 14, 2010, Pates 349-360.

http://herkules.oulu.fi/isbn9789514287763, Antti Tolli, "Resource Management in Cooperative MIMO-OFDM Cellular Systems," Academic Dissertation—ACTA Univeisitatis Ouluensis, No. C Technica 296, Apr. 11, 2008, Pates 1-198.

Patent Cooperation Treaty, International Search Report for PCT/US2013/070489, mail date Feb. 24, 2014, 4 pages.

Attygalle et al., "Extending Optical Transmission Distance in Fiber Wireless Links Using Passive Filtering in Conjunction with Optimized Modulation," Journal of Lightwave Technology, vol. 24, No. 4, Apr. 2006, 7 pages.

Bo Zhang et al., "Reconfigurable Multifunctional Operation Using Optical Injection-Locked Vertical-Cavity Surface Emitting Lasers," Journal of Lightwave Technology, vol. 27, No. 15, Aug. 2009, 6 pages.

Chang-Hasnain, et al., "Ultrahigh-speed laser modulation by injection locking," Chapter 6, Optical Fiber Telecommunication V A: Components and Subsystems, Elsevier Inc., 2008, 20 pages.

Cheng Zhang et al., "60 GHz Millimeter-wave Generation by Two-mode Injection-locked Fabry-Perot Laser Using Second-Order Sideband Injection in Radio-over-Fiber System," Conference on Lasers and Electro-Optics and Quantum Electronics, Optical Society of America, May 2008, 2 pages.

Chrostowski, "Optical Injection Locking of Vertical Cavity Surface Emitting Lasers," Fall 2003, PhD dissertation University of California at Berkely, 122 pages.

Dang et al., "Radio-over-Fiber based architecture for seamless wireless indoor communication in the 60GHz band," Computer Communications, Elsevier B.V., Amsterdam, NL, vol. 30, Sep. 8, 2007, pp. 3598-3613.

(56) References Cited

OTHER PUBLICATIONS

Hyuk-Kee Sung et al., "Optical Single Sideband Modulation Using Strong Optical Injection-Locked Semiconductor Lasers," IEEE Photonics Technology Letters, vol. 19, No. 13, Jul. 1, 2007, 4 pages.
Lim et al., "Analysis of Optical Carrier-to-Sideband Ratio for Improving Transmission Performance in Fiber-Radio Links," IEEE Transactions of Microwave Theory and Techniques, vol. 54, No. 5, May 2006, 7 pages.
Lu H H et al., "Improvement of radio-on-multimode fiber systems based on light injection and optoelectronic feedback techniques," Optics Communications, vol. 266, No. 2, Elsevier B.V., Oct. 15, 2006, 4 pages.
Pleros et al., "A 60 GHz Radio-Over-Fiber Network Architecture for Seamless Communication With High Mobility," Journal of Lightwave Technology, vol. 27, No. 12, IEEE, Jun. 15, 2009, pp. 1957-1967.
Reza et al., "Degree-of-Polarization-Based PMD Monitoring for Subcarrier-Multiplexed Signals Via Equalized Carrier/Sideband Filtering," Journal of Lightwave Technology, vol. 22, No. 4, IEEE, Apr. 2004, 8 pages.
Zhao, "Optical Injection Locking on Vertical-Cavity Surface-Emitting Lasers (VCSELs): Physics and Applications," Fall 2008, PhD dissertation University of California at Berkeley, pp. 1-209.
Advisory Action for U.S. Appl. No. 12/712,758 mailed Sep. 16, 2013, 3 pages.
Final Office Action for U.S. Appl. No. 12/712,758 mailed May 24, 2013, 17 pages.
Non-final Office Action for U.S. Appl. No. 12/712,758 mailed Jan. 10, 2012, 14 pages.
Examination Report for European patent application 07835803.3 mailed Aug. 13, 2013, 6 pages.
Extended European Search Report for patent application 10014262.9 mailed Mar. 14, 2011, 6 pages.
International Search Report and Written Opinion for PCT/US2012/034853 mailed Aug. 6, 2012, 12 pages.
International Search Report and Written Opinion for PCT/US2012/034855 mailed Jul. 26, 2012, 10 pages.
Written Opinion of the International Searching Authority for European patent application 11701916.6 mailed Sep. 21, 2012, 10 pages.
International Search Report for PCT/US2011/021799 mailed Apr. 6, 2011, 4 pages.
Examination Report for European patent application 10702806.0 mailed Sep. 12, 2013, 11 pages.
Non-final Office Action for U.S. Appl. No. 13/194,429 mailed Mar. 1, 2013, 22 pages.
Notice of Allowance for U.S. Appl. No. 131194,429 mailed Jul. 9, 2013, 9 pages.
International Search Report for PCT/US2011/043405 mailed Apr. 25, 2012, 4 pages.
Non-final Office Action for U.S. Appl. No. 11/958,062 mailed Nov. 6, 2013, 16 pages.
Chowdhury et al., "Multi-service Multi-carrier Broadband MIMO Distributed Antenna Systems for In-building Optical Wireless Access," Presented at the 2010 Conference on Optical Fiber Communication and National Fiber Optic Engineers Conference, Mar. 21-25, 2010, San Diego, California, IEEE, pp. 1-3.
International Search Report and Written Opinion for PCT/US2007/025855 mailed Mar. 19, 2008, 14 pages.
International Preliminary Report on Patentability for PCT/US2007/025855 mailed Jul. 2, 2009, 9 pages.
Bahl et al. "Enhancements to the RADAR User Location and Tracking System," Microsoft Research Technical Report, Feb. 2000, pp. 1-13.
Frikel et al, "A Robust Mobile Positioning Algorithm," EURASIP Proceedings, ISCCSP 2006, pp. 1-4.
Pahlavan et al, "An Overview of Wireless Indoor Geolocation Techniques and Systems," LNCS 1818, pp. 1-13, 2000.
Wann et al, "Hybrid TDOA/AOA Indoor Positioning and Tracking Using Extended Kalman Filters," 63rd IEEE VTC 2006, pp. 1058-1062.

Biton et al., "Challenge: CeTV and Ca—Fi—Cellular and Wi-Fi over CATV," Proceedings of the Eleventh Annual International Conference on Mobile Computing and Networking, Aug. 28-Sep. 2, 2005, Cologne, Germany, Association for Computing Machinery, 8 pages.
Hansryd, Jonas et al., "Microwave capacity evolution," Ericsson Review, Jun. 21, 2011, 6 pages.
Seto et al., "Optical Subcarrier Multiplexing Transmission for Base Station With Adaptive Array Antenna," IEEE Transactions on Microwave Theory and Techniques, vol. 49, No. 10, Oct. 2001, pp. 2036-2041.
Examination Report for European Patent Application No. 11733965.5 mailed Oct. 10, 2014, 6 pages.
International Search Report for PCT/US2013/034328 mailed Jul. 3, 2013, 5 pages.
International Preliminary Report on Patentability for PCT/US2013/034328 mailed Oct. 1, 2014, 8 pages.
Non-final Office Action for U.S. Appl. No. 13/598,078 mailed Dec. 22, 2014, 7 pages.
Non-Final Office Action for U.S. Appl. No. 14/078,949 mailed Sep. 10, 2015, 29 pages.
Notice of Allowance for U.S. Appl. No. 13/598,078 mailed May 12, 2015, 8 pages.
Non-final Office Action for U.S. Appl. No. 14/148,908 mailed May 22, 2015, 20 pages.
Notice of Allowance for U.S. Appl. No. 14/242,139 mailed Oct. 22, 2014, 12 pages.
Diehm, et al., "The FUTON Prototype: Broadband Communication through Coordinated Multi-Point using a Novel integrated Optical/Wireless Architecture," Presented at Globecom Workshops, Dec. 6-10, 2010, Miami, Florida, IEEE, pp. 757-762.
Fan, Shu-Hao et al., "Spectrally Efficient 60-GHz xy-MIMO Data Transport over a Radio-Over-Fiber System for Gigabit Wireless Local Area Networks," Presented at IEEE Global Telecommunications Conference, Dec. 6-10, 2010, Miami, Florida, IEEE, 4 pages.
Lee et al., "Evaluation of 60 GHz MIMO Channel Capacity in the Conference Room STA-STA Scenario," Vehicular Technology Conference (VTC Sping), 2011 IEEE 73rd, pp. 1-5, May 15-18, 2011.
Sheldon, C. et al., "A 60GHz Line-of-Sight 2x2 MIMO Link Operating at 1.2 GBPS," Presented at Antennas and Propogation Society International Symposium, Jul. 5-11, 2008, San Diego, California, IEEE, 4 pages.
Written Opinion for European Patent Application No. 13798863.0 mailed Aug. 6, 2015, 10 pages.
Non-final Office Action for U.S. Appl. No. 14/487,232 mailed Jun. 23, 2015, 15 pages.
Notice of Allowance for U.S. Appl. No. 14/227,108 mailed Nov. 18, 2015, 8 pages.
Final Office Action for U.S. Appl. No. 14/487,232 mailed Oct. 15, 2015, 7 pages.
Notice of Allowance for U.S. Appl. No. 14/078,949 mailed Feb. 3, 2016, 9 pages.
Non-final Office Action for U.S. Appl. No. 14/447,014 mailed Jan. 20, 2016, 6 pages.
Non-final Office Action for U.S. Appl. No. 14/079,977 mailed Mar. 4, 2016, 21 pages.
Notice of Allowance for U.S. Appl. No. 14/079,977 mailed Apr. 29, 2016, 8 pages.
Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.
Bakaul, M., et al., "Efficient Multiplexing Scheme for Wavelength-Interleaved Dwdm Millimeter-Wave Fiber-Radio Systems," IEEE Photonics Technology Letters, Dec. 2005, vol. 17, No. 12, pp. 2718-2720.
Cho, Bong Youl et al. "The Forward Link Performance of a PCS System with an AGC," 4th CDMA International Conference and Exhibition, "The Realization of IMT-2000," 1999, 10 pages.
Chu, Ta-Shing et al. "Fiber optic microcellular radio", IEEE Transactions on Vehicular Technology, Aug. 1991, pp. 599-606, vol. 40, Issue 3.

(56) References Cited

OTHER PUBLICATIONS

Cooper, A.J., "Fiber/Radio for the Provision of Cordless/Mobile Telephony Services in the Access Network," Electronics Letters, 1990, pp. 2054-2056, vol. 26.
Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.
Dolmans, G. et al. "Performance study of an adaptive dual antenna handset for indoor communications", IEE Proceedings: Microwaves, Antennas and Propagation, Apr. 1999, pp. 138-144, vol. 146, Issue 2.
Ellinger, Frank et al., "A 5.2 GHz variable gain LNA MMIC for adaptive antenna combining", IEEE MTT-S International Microwave Symposium Digest, Anaheim, California, Jun. 13-19, 1999, pp. 501-504, vol. 2.
Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.
Gibson, B.C., et al., "Evanescent Field Analysis of Air-Silica Microstructure Waveguides," The 14th Annual Meeting of the IEEE Lasers and Electro-Optics Society, 1-7803-7104-4/01, Nov. 12-13, 2001, vol. 2, pp. 709-710.
Huang, C., et al., "A WLAN-Used Helical Antenna Fully Integrated with the PCMCIA Carrier," IEEE Transactions on Antennas and Propagation, Dec. 2005, vol. 53, No. 12, pp. 4164-4168.
Kojucharow, K., et al., "Millimeter-Wave Signal Properties Resulting from Electrooptical Upconversion," IEEE Transaction on Microwave Theory and Techniques, Oct. 2001, vol. 49, No. 10, pp. 1977-1985.
Monro, T.M., et al., "Holey Fibers with Random Cladding Distributions," Optics Letters, Feb. 15, 2000, vol. 25, No. 4, pp. 206-208.
Moreira, J.D., et al., "Diversity Techniques for OFDM Based WLAN Systems," The 13th IEEE International Symposium on Personal, Indoor and Mobile Radio Communications, Sep. 15-18, 2002, vol. 3, pp. 1008-1011.
Niiho, T., et al., "Multi-Channel Wireless LAN Distributed Antenna System Based on Radio-Over-Fiber Techniques," The 17th Annual Meeting of the IEEE Lasers and Electro-Optics Society, Nov. 2004, vol. 1, pp. 57-58.
Author Unknown, "ITU-T G.652, Telecommunication Standardization Sector of ITU, Series G: Transmission Systems and Media, Digital Systems and Networks, Transmission Media and Optical Systems Characteristics—Optical Fibre Cables, Characteristics of a Single-Mode Optical Fiber and Cable," ITU-T Recommendation G.652, International Telecommunication Union, Jun. 2005, 22 pages.
Author Unknown, "ITU-T G.657, Telecommunication Standardization Sector of ITU, Dec. 2006, Series G: Transmission Systems and Media, Digital Systems and Networks, Transmission Media and Optical Systems Characteristics—Optical Fibre Cables, Characteristics of a Bending Loss Insensitive Single Mode Optical Fibre and Cable for the Access Network," ITU-T Recommendation G.657, International Telecommunication Union, 20 pages.
Author Unknown, RFID Technology Overview, 11 pages.
Opatic, D., "Radio over Fiber Technology for Wireless Access," Ericsson, Oct. 17, 2009, 6 pages.
Paulraj, A.J., et al., "An Overview of MIMO Communications—A Key to Gigabit Wireless," Proceedings of the IEEE, Feb. 2004, vol. 92, No. 2, 34 pages.
Pickrell, G.R., et al., "Novel Techniques for the Fabrication of Holey Optical Fibers," Proceedings of SPIE, Oct. 28-Nov. 2, 2001, vol. 4578, 2001, pp. 271-282.
Roh, W., et al., "MIMO Channel Capacity for the Distributed Antenna Systems," Proceedings of the 56th IEEE Vehicular Technology Conference, Sep. 2002, vol. 2, pp. 706-709.
Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.
Seto, I., et al., "Antenna-Selective Transmit Diversity Technique for OFDM-Based WLANs with Dual-Band Printed Antennas," 2005 IEEE Wireless Communications and Networking Conference, Mar. 13-17, 2005, vol. 1, pp. 51-56.
Shen, C., et al., "Comparison of Channel Capacity for MIMO-DAS versus MIMO-CAS," The 9th Asia-Pacific Conference on Communications, Sep. 21-24, 2003, vol. 1, pp. 113-118.
Wake, D. et al., "Passive Picocell: A New Concept n Wireless Network Infrastructure," Electronics Letters, Feb. 27, 1997, vol. 33, No. 5, pp. 404-406.
Windyka, John et al., "System-Level Integrated Circuit (SLIC) Technology Development for Phased Array Antenna Applications," Contractor Report 204132, National Aeronautics and Space Administration, Jul. 1997, 94 pages.
Winters, J., et al., "The Impact of Antenna Diversity on the Capacity of Wireless Communications Systems," IEEE Transcations on Communications, vol. 42, No. 2/3/4, Feb./Mar./Apr. 1994, pp. 1740-1751.
Yu et al., "A Novel Scheme to Generate Single-Sideband Millimeter-Wave Signals by Using Low-Frequency Local Oscillator Signal," IEEE Photonics Technology Letters, vol. 20, No. 7, Apr. 1, 2008, pp. 478-480.
Second Office Action for Chinese patent application 20078002293.6 mailed Aug. 30, 2012, 10 pages.
International Search Report for PCT/US2010/022847 mailed Jul. 12, 2010, 3 pages.
International Search Report for PCT/US2010/022857 mailed Jun. 18, 2010, 3 pages.
Decision on Appeal for U.S. Appl. No. 11/451,237 mailed Mar. 19, 2013, 7 pages.
Decision on Rejection for Chinese patent application 200780022093.6 mailed Feb. 5, 2013, 9 pages.
International Search Report and Written Opinion for International patent application PCT/US2007/013802 mailed May 8, 2008, 12 pages.

\* cited by examiner

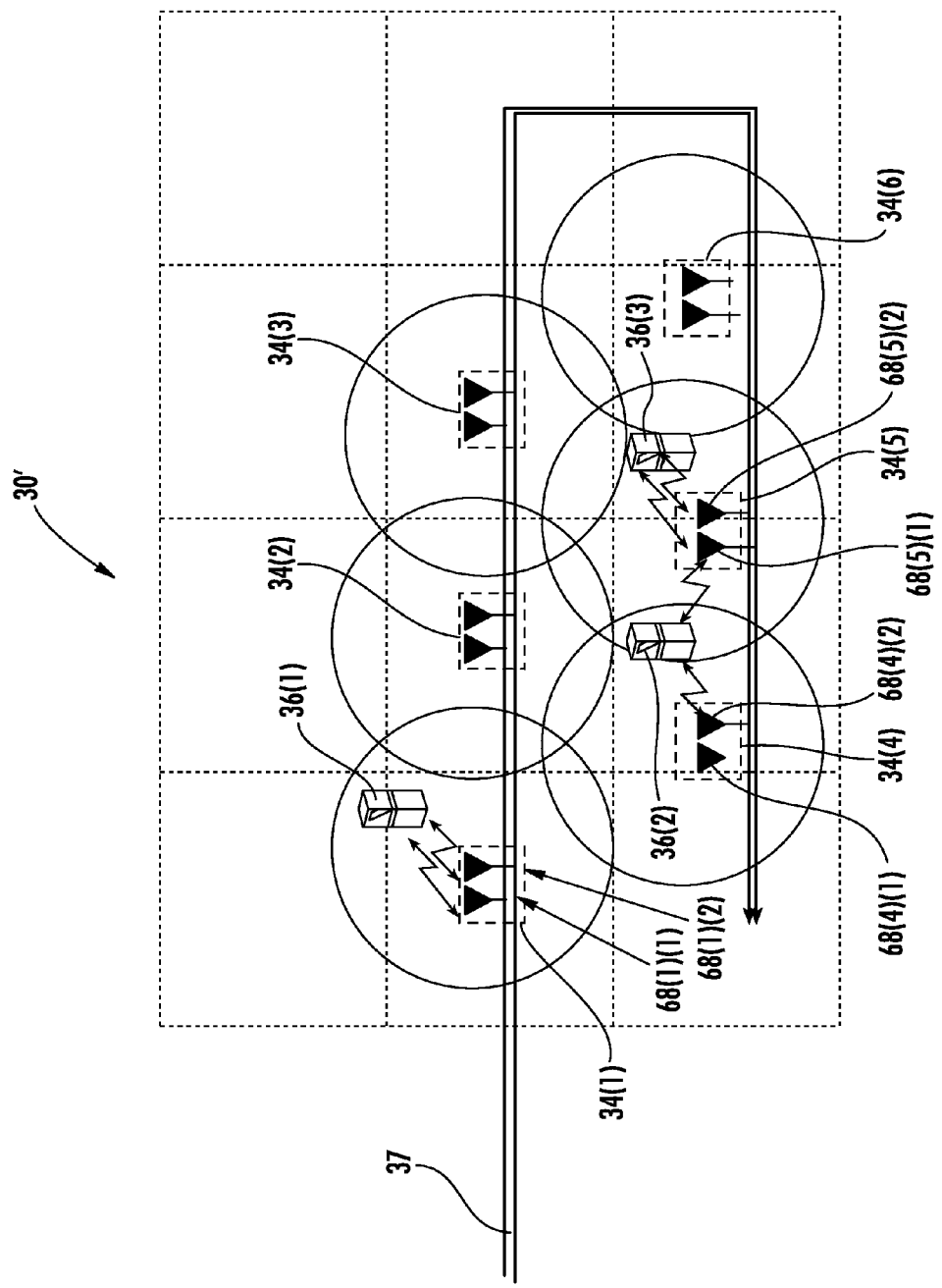

| REMOTE UNIT ID (124) | CLIENT DEVICE ID (122) | CELL BONDING MODE (126) |
|---|---|---|
| REMOTE UNIT 1 | UE 1 - 36(1)<br>UE 3 - 36(3)<br>UE 9 - 36(9) | INTRA-CELL BONDED<br>INTER-CELL BONDED<br>INTRA-CELL BONDED |
| REMOTE UNIT 2 | UE 3 - 36(3)<br>UE 2 - 36(2)<br>⋮<br>UE N - 36(N) | INTER-CELL BONDED<br>INTRA-CELL BONDED<br>⋮<br>INTER-CELL BONDED |
| ⋮ | | |
| REMOTE UNIT M | UE N - 36(N)<br>UE 4 - 36(4)<br>⋮ | INTER-CELL BONDED<br>INTRA-CELL BONDED |

FIG. 7

| REMOTE UNIT ID (134) | NEIGHBOURING REMOTE UNITS(34) (132) |
|---|---|
| REMOTE UNIT 1 | REMOTE UNIT 1, REMOTE UNIT 2, REMOTE UNIT 3, REMOTE UNIT 4 |
| REMOTE UNIT 2 | REMOTE UNIT 1, REMOTE UNIT 3, REMOTE UNIT 8, REMOTE UNIT M-1 |
| . | |
| REMOTE UNIT M | REMOTE UNIT M-4, REMOTE UNIT M-3, REMOTE UNIT M-2, REMOTE UNIT M-1 |

FIG. 8

HYBRID INTRA-CELL / INTER-CELL REMOTE UNIT ANTENNA BONDING IN MULTIPLE-INPUT, MULTIPLE-OUTPUT (MIMO) DISTRIBUTED ANTENNA SYSTEMS (DASS)

PRIORITY APPLICATION

This application is a continuation of International Application No. PCT/US13/70489 filed on Nov. 18, 2013, which claims the benefit of priority to U.S. Provisional Application No. 61/731,043, filed on Nov. 29, 2012, both applications being incorporated herein by reference in their entireties.

BACKGROUND

Field of the Disclosure

The technology of the present disclosure relates to distributed antenna systems that are capable of distributing wireless radio-frequency (RF) communications services over wired communications mediums.

Technical Background

Wireless communication is rapidly growing, with ever-increasing demands for high-speed mobile data communication. As an example, "wireless fidelity" or "WiFi" systems and wireless local area networks (WLANs) are being deployed in many different types of areas (coffee shops, airports, libraries, etc.). Wireless communication systems communicate with wireless devices called "clients," which must reside within the wireless range or "cell coverage area" in order to communicate with the access point device.

One approach to deploying a wireless communication system involves the use of "picocells." Picocells are radio frequency (RF) coverage areas having a radius in the range from about a few meters up to about twenty (20) meters. Picocells can be provided to provide a number of different services (e.g., WLAN, voice, radio frequency identification (RFID) tracking, temperature and/or light control, etc.). Because a picocell covers a small area, there are typically only a few users (clients) per picocell. Picocells also allow for selective wireless coverage in small regions that otherwise would have poor signal strength when covered by larger cells created by conventional base stations.

In conventional wireless systems, as illustrated in FIG. 1, picocell coverage areas 10 in a distributed communications system 12 are created by and centered on remote antenna units 14 connected to a head-end equipment 16 (e.g., a head-end controller or head-end unit). The remote antenna units 14 receive wireless communications services from the head-end equipment 16 over a communications medium 17 to be distributed in their coverage area 10. The remote antenna unit includes information processing electronics, an RF transmitter/receiver, and an antenna 18 operably connected to the RF transmitter/receiver to wireless distribute the wireless communication services to wireless client devices 20 within the coverage area 10. The size of a coverage area 10 is determined by the amount of RF power transmitted by the remote antenna unit 14, receiver sensitivity, antenna gain and the RF environment, as well as by the RF transmitter/receiver sensitivity of the client device 20. Client devices 20 usually have a fixed RF receiver sensitivity, so that the properties of the remote antenna unit 14 mainly determine the picocell coverage area size.

One problem that can exist with wireless communication systems, including the system 10 in FIG. 1, is the multi-path (fading) nature of signal propagation. This simply means that local maxima and minima of desired signals can exist over a picocell coverage area. A receiver antenna located at a maximum location will have better performance or signal-to-noise ratio (SNR) than a receiver antenna located in a minimum position. Signal processing techniques can be employed to improve the SNR of wireless data transmission in such wireless communication systems. For example, spatial diversity can be utilized in instances involving many access points. Other signal processing techniques include Multiple Input/Multiple Output (MIMO) techniques for increasing bit rates or beam forming for SNR, or wireless distance improvement. MIMO is the use of multiple antennas at both a transmitter and receiver to increase data throughput and link range without additional bandwidth or increased transmit power. MIMO technology can be employed in distributed antenna systems (DAS) to increase the bandwidth up to twice the nominal bandwidth.

Even with the potential doubling of bandwidth in a distributed communication system employing MIMO technology, a client device must still be within range of two MIMO antennas to realize the full benefits of increased bandwidth of MIMO technology. Ensuring uniform MIMO coverage may be particularly important for newer cellular standards, such as Long Term Evolution (LTE), where increased bandwidth requirements are expected by users of client devices in all coverage areas.

Current MIMO distributed communication systems may not provide uniform coverage areas, particularly in the edges of coverage cells. In this regard to further illustrate this problem, FIG. 2A illustrates a portion of exemplary MIMO coverage areas 10 in the distributed communications system 12 in FIG. 1. The MIMO coverage areas 10 in FIG. 2A are provided by two remote antenna units 14(1), 14(2), which are separated at a distance $D_1$ from each other. Each remote antenna unit 14(1), 14(2) has two antennas 18(1)(1), 18(1)(2) and 18(2)(1), 18(2)(2) respectively. The antenna pairs 18(1)(1), 18(1)(2) and 18(2)(1), 18(2)(2) are each capable of being configured to be intra-cell bonded together to operate in MIMO configuration. By intra-cell remote unit antenna bonding, it is meant that an antenna pair 18 in a particular remote antenna unit 14 are both involved in communications with a particular client device to provide MIMO communications. The first remote antenna unit 14(1) provides a first MIMO coverage area 22(1) using antennas 18(1)(1) and 18(1)(2). The second remote antenna unit 14(2) provides a second MIMO coverage area 22(2) using antennas 18(2)(1) and 18(2)(2). A wireless client device (not shown) located within the first MIMO coverage area 22(1) will receive MIMO services by remote antenna unit 14(1), because the client device will be in range of both antennas 18(1)(1) and 18(1)(2). Similarly, a client device located within the second MIMO coverage area 22(2) will receive MIMO services by remote antenna unit 14(2), because the client device will be in range of both antennas 18(2)(1) and 18(2)(2).

If a client device is located in a coverage area 24 outside or on the edge of the first and second MIMO coverage areas 22(1), 22(2), the client device may still be in communication range of at least one of the antennas 18 of the remote antenna units 14(1), 14(2) to receive communications services. However, the client device will not be in communication range with sufficient SNR ratio of both antenna pairs 18(1)(1), 18(1)(2) or 18(2)(1), 18(2)(2) of a remote antenna unit 14(1), 14(2), and thus will not receive MIMO communications services. FIG. 2B illustrates an exemplary graph 26 illustrating one relationship between antenna 18 separation of the remote antenna units 14(1), 14(2) and MIMO condition number (CN) in decibels (dB). For a 700 MHz communications service frequency, the allowed maximum antenna 18 separation is approximately twenty (20) meters for MIMO capacity of six (6) bits per section per Hertz (s/Hz), assuming a condition number of 60 dB illustrated as line 28. At a 2.6 GHz communications service frequency, the allowed maximum antenna 18 separation is approximately ten (10) meters for MIMO capacity of six (6) bits per section per Hertz (s/Hz), assuming a condition number of 60 dB.

An increased number of remote antenna units could be provided to reduce the maximum separations between MIMO antennas, and thus reduce or eliminate non-MIMO coverage areas. However, providing an increased number of remote antenna units in a distributed communications system increases system cost. Also, providing an increased number of remote antenna units can add additional complexity and associated cost by requiring support of a greater number of remote antenna units in the distributed communications systems.

SUMMARY OF THE DETAILED DESCRIPTION

Embodiments disclosed herein include hybrid intra-cell/inter-cell remote unit antenna bonding in multiple-input, multiple-output (MIMO) distributed antenna systems (DASs). Related components, systems, and methods are also disclosed. In certain embodiments disclosed herein, MIMO distributed antenna systems are provided that are capable of supporting distributed MIMO communications with client devices in wireless communication range of remote units. MIMO communications involve use of multiple MIMO antennas at both a transmitter and receiver to increase data throughput and link range to increase bandwidth up to twice nominal bandwidth.

To provide enhanced MIMO coverage areas in MIMO DASs, hybrid intra-cell/inter-cell remote unit antenna bonding is employed. Intra-cell remote unit antenna bonding is the involvement or bonding of MIMO antennas within a single remote unit to provide MIMO communications with a client device. Inter-cell remote unit antenna bonding is the involvement or bonding of MIMO antennas between separate, neighboring remote units to provide MIMO communications with a client device. For example, if a client device has acceptable and/or higher MIMO communications signal quality with MIMO antennas within a single remote unit, intra-cell bonding of the MIMO antennas can be employed for MIMO communications to provide MIMO coverage to avoid power imbalance issues that may result with inter-cell bonded remote unit antennas. However, as another example, if a client device has acceptable and/or higher MIMO communications signal quality with MIMO antennas with one or more neighboring remote units, inter-cell bonding of the MIMO antennas can be employed for MIMO communications to provide MIMO coverage that may not otherwise be available from intra-cell bonding. More sparse and lower cost remote unit deployments can thus provide substantially uniform high-capacity MIMO DAS coverage.

In one embodiment, a method of providing hybrid intra-cell/inter-cell remote unit antenna bonding for multiple-input, multiple-output (MIMO) communications with a client device in a MIMO DAS comprises configuring intra-cell antenna bonding for MIMO communications for a client device at a first remote unit in a MIMO DAS. The method also comprises receiving intra-cell antenna bonded MIMO communications signals from the client device at the first remote unit, and determining if the received intra-cell antenna bonded MIMO communications signals at the first remote unit exceed a threshold MIMO communications signal quality. If the received intra-cell antenna bonded MIMO communications signals at the first remote unit do not exceed the threshold MIMO communications signal quality, the method further comprises receiving MIMO communications signals from the client device from at least one neighboring remote unit to the first remote unit, and determining if the received MIMO communications signals at the at least one neighboring remote unit exceed a threshold MIMO communications signal quality. If the received MIMO communications signals at the at least one neighboring remote unit exceed the threshold MIMO communications signal quality, the method also comprises configuring inter-cell antenna bonding for MIMO communications for the client device in the at least one neighboring remote unit.

In another embodiment, a controller for providing hybrid intra-cell/inter-cell remote unit antenna bonding for multiple-input, multiple-output (MIMO) communications with a client device in a MIMO DAS is configured to configure intra-cell antenna bonding for MIMO communications for a client device at a first remote unit in a MIMO DAS. The controller is also configured to receive intra-cell antenna bonded MIMO communications signals from the client device at the first remote unit, and to determine if the received intra-cell antenna bonded MIMO communications signals at the first remote unit exceed a threshold MIMO communications signal quality. If the received intra-cell antenna bonded MIMO communications signals at the first remote unit do not exceed the threshold MIMO communications signal quality, the controller is configured to receive MIMO communications signals from the client device from at least one neighboring remote unit to the first remote unit, and determine if the received MIMO communications signals at the at least one neighboring remote unit from the client device exceed a threshold MIMO communications signal quality. If the received MIMO communications signals at the at least one neighboring remote unit exceed the threshold MIMO communications signal quality, the controller is configured to configure inter-cell antenna bonding for MIMO communications for the client device in the at least one neighboring remote unit.

In another embodiment, a computer-readable medium having instructions for causing a computer to execute a method of providing hybrid intra-cell/inter-cell remote unit antenna bonding for multiple-input, multiple-output (MIMO) communications with a client device in a MIMO DAS is provided. The instructions cause the computer to configure intra-cell antenna bonding for MIMO communications for a client device at a first remote unit in a MIMO DAS, to receive intra-cell antenna bonded MIMO communications signals from the client device at the first remote unit, and cause the computer to determine if the received intra-cell antenna bonded MIMO communications signals at the first remote unit exceed a threshold MIMO communications signal quality. If the received intra-cell antenna bonded MIMO communications signals at the first remote unit do not exceed the threshold MIMO communications signal quality, the instructions also cause the computer to receive MIMO communications signals from the client device from at least one neighboring remote unit to the first remote unit, and determine if the received MIMO communications signals at the at least one neighboring remote unit from the client device exceed a threshold MIMO communications signal quality. If the received MIMO communications signals at the at least one neighboring remote unit exceed the threshold MIMO communications signal quality, the instructions also cause the computer to configure inter-cell antenna bonding for MIMO communications for the client device in the at least one neighboring remote unit.

Additional features and advantages will be set forth in the detailed description which follows, and in part, will be readily apparent to those skilled in the art from that description or recognized by practicing the embodiments as described herein, including the detailed description that follows, the claims, as well as the appended drawings.

BRIEF DESCRIPTION OF THE FIGURES

FIG. 5 is a schematic diagram of hybrid intra-cell/inter-cell remote unit antenna bonding provided in an adapted MIMO DAS of FIGS. 3A and 3B.

FIG. 7 is a dynamic cell antenna bonding table used in the process in FIGS. 6A and 6B to dynamically store and identify intra-cell bonded remote unit antennas and inter-cell bonded remote unit antennas for active client device communications in the system of FIG. 5.

FIG. 8 is a remote unit mapping table used in the process in FIGS. 6A and 6B to identify and determine read MIMO communications signal qualities in neighboring remote units in the MIMO DAS of FIG. 5 for determining whether to retain a current remote unit antenna bonding mode or switch remote unit antenna bonding modes.

DETAILED DESCRIPTION

Reference will now be made in detail to the embodiments, examples of which are illustrated in the accompanying drawings, in which some, but not all embodiments are shown. Whenever possible, like reference numbers will be used to refer to like components or parts.

Embodiments disclosed herein include hybrid intra-cell/inter-cell remote unit antenna bonding that provide enhanced MIMO coverage in MIMO distributed antenna systems (DASs). In certain embodiments, MIMO DASs are capable of supporting distributed MIMO communications with client devices in wireless range of remote units. MIMO communications involve use of multiple MIMO antennas at both a transmitter and receiver to increase data throughput and link range to increase bandwidth up to twice nominal bandwidth.

Intra-cell remote unit antenna bonding is the involvement or bonding of MIMO antennas within a single remote unit to provide MIMO communications with a client device. Inter-cell remote unit antenna bonding is the involvement or bonding of MIMO antennas between separate, neighboring remote units to provide MIMO communications with a client device. For example, if a client device has acceptable and/or higher MIMO communications signal quality with MIMO antennas within a single remote unit, intra-cell antenna bonding of the MIMO antennas can be employed for MIMO communications to provide MIMO coverage to avoid power imbalance issues that may result with inter-cell bonded remote unit antennas. However, if a client device has acceptable and/or higher MIMO communications signal quality with MIMO antennas with one or more neighboring remote units, inter-cell antenna bonding of the MIMO antennas can provide MIMO coverage that may not otherwise be available through intra-cell bonding.

Figure 3A:
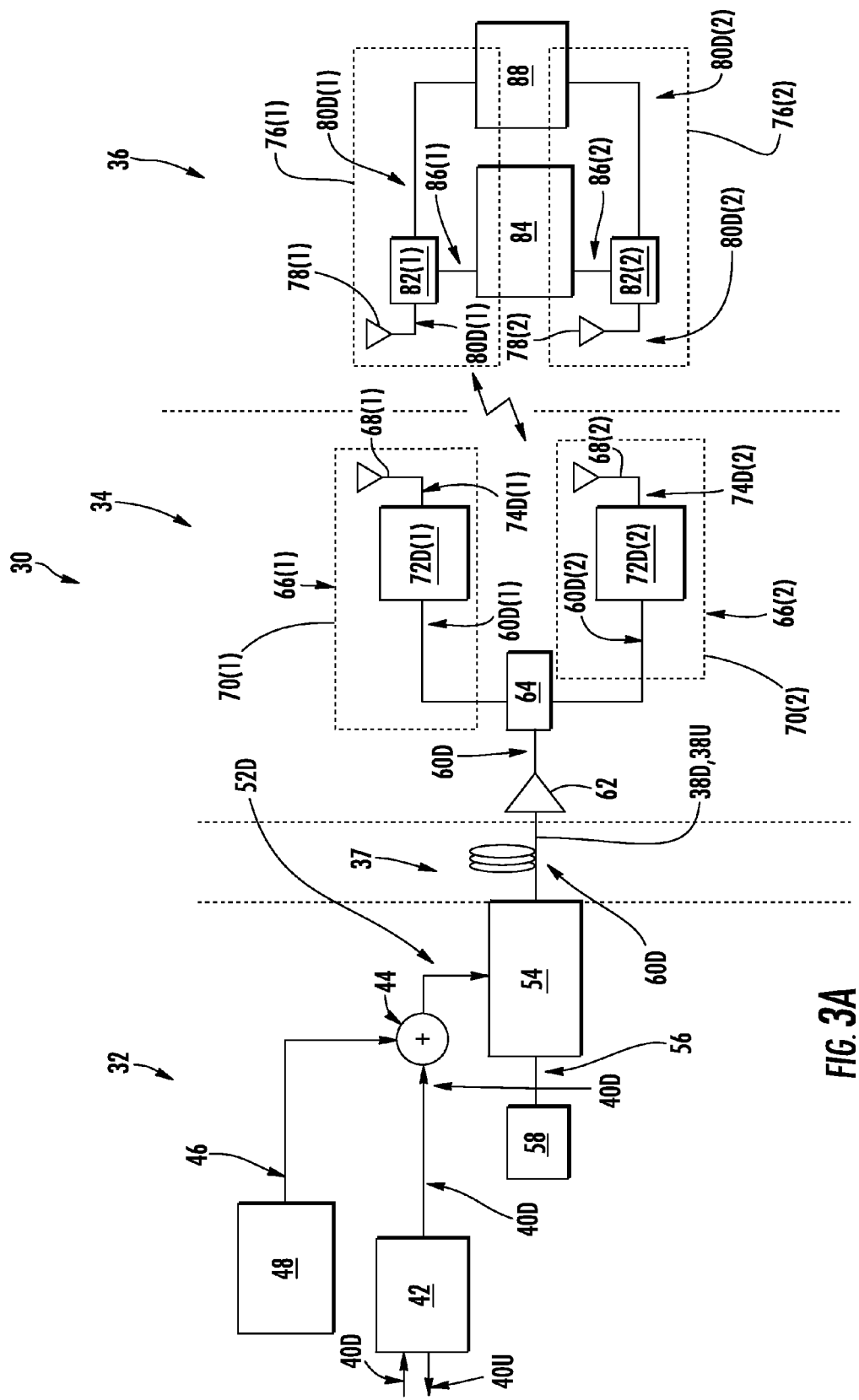
FIG. 3A is a schematic diagram of a MIMO distributed antenna system configured to support MIMO communications services with client devices.

Before discussing hybrid intra-cell/inter-cell remote unit antenna bonding starting at FIG. 5, an exemplary MIMO DAS is described in regard to FIGS. 3A-4C. FIG. 3A is a schematic diagram of an exemplary MIMO optical fiber-based distributed antenna system 30 (hereinafter referred to as "MIMO DAS 30"). The MIMO DAS 30 is configured to operate in MIMO configuration, which involves the use of multiple antennas at both a transmitter and receiver to improve communication performance. A central unit 32 is provided that is configured to distribute downlink communications signals to one or more remote units 34. FIG. 3A only illustrates one remote unit 34, but note that a plurality of remote units 34 is typically provided. The remote units 34 are configured to wirelessly communicate the downlink communications signals to one or more wireless client devices 36 (also referred to herein as "client devices 36") that are in communication range of the remote unit 34. The remote units 34 may also be referred to as "remote antenna units 34" because of their wireless transmission over antenna functionality. The remote unit 34 is also configured to receive uplink communications signals from the client devices 36 to be distributed to the central unit 32.

In this embodiment, an optical fiber communications medium 37 comprising at least one downlink optical fiber 38D and at least one uplink optical fiber 38U is provided to communicatively couple the central unit 32 to the remote units 34. The central unit 32 is also configured to receive uplink communications signals from the remote units 34 via the optical fiber communications medium 37, although more specifically over the at least one uplink optical fiber 38U. The client device 36 in communication with the remote unit 34 can provide uplink communications signals to the remote unit 34 which are then distributed over the optical fiber communications medium 37 to the central unit 32 to be provided to a network or other source, such as a base station for example.

With continuing reference to FIG. 3A, more detail will be discussed regarding the components of the central unit 32, the remote unit 34, and the client device 36 and the distribution of downlink communications signals. The central unit 32 is configured to receive electrical downlink MIMO communications signals 40D from outside the MIMO DAS 30 in a signal processor 42 and provide electrical uplink communications signals 40U, received from client devices 36, to other systems. The signal processor 42 may be configured to provide the electrical downlink communications signals 40D to a mixer 44, which may be an IQ signal mixer in this example. The mixer 44 is configured to convert the electrical downlink MIMO communications signals 40D to IQ signals. The mixer 44 is driven by a frequency signal 46 that is provided by a local oscillator 48. Frequency conversion is optional. In this embodiment, it is desired to up-convert the frequency of the electrical downlink MIMO communications signals 40D to a higher frequency to provide electrical downlink MIMO communications signals 52D to provide for a greater bandwidth capability before distributing the electrical downlink MIMO communications signals 52D to the remote units 34. For example, the up-conversion carrier frequency may be provided as an extremely high frequency (e.g., approximately 30 GHz to 300 GHz).

With continuing reference to FIG. 3A, because the communication medium between the central unit 32 and the remote unit 34 is the optical fiber communications medium 37, the electrical downlink MIMO communications signals 52D are converted to optical signals by an electro-optical converter 54. The electro-optical converter 54 includes components to receive a light wave 56 from a light source 58, such as a laser. The light wave 56 is modulated by the frequency oscillations in the electrical downlink MIMO communications signals 52D to provide optical downlink MIMO communications signals 60D over the downlink optical fiber 38D to the remote unit 34. The electro-optical converter 54 may be provided so that the electrical downlink MIMO communications signals 52D are provided as radio-over-fiber (RoF) communications signals.

Figure 3B:
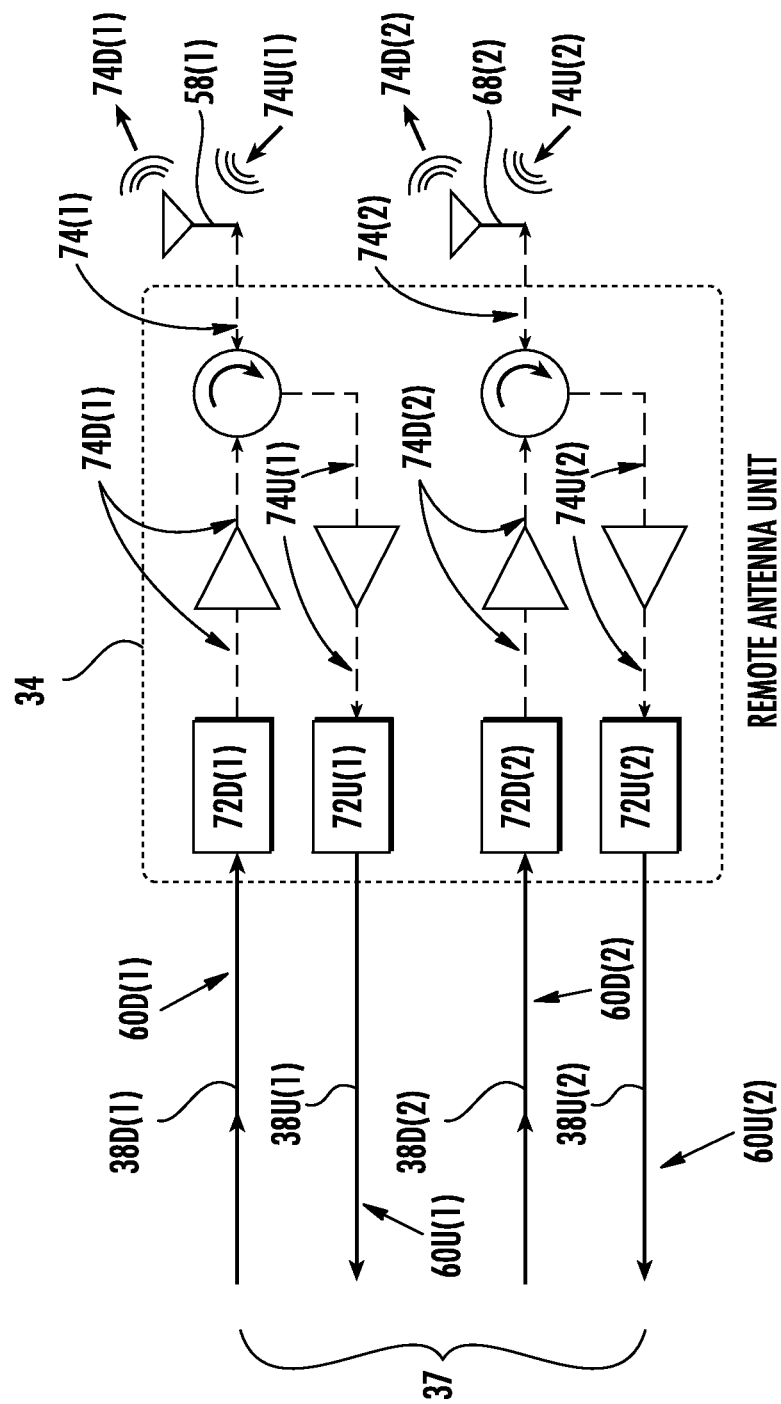
FIG. 3B is a schematic of a downlink path and uplink path and related components of the remote unit in the MIMO DAS of FIG. 3A.

With continuing reference to FIG. 3A, the optical downlink MIMO communications signals 60D are received by an optical bi-directional amplifier 62, which is then provided to a MIMO splitter 64 in the remote unit 34. The MIMO splitter 64 is provided so that the optical downlink MIMO communications signals 60D can be split among two separate downlink communication paths 66(1), 66(2) to be radiated over two separate MIMO antennas 68(1), 68(2) provided in two separate MIMO transmitters 70(1), 70(2) configured in MIMO configuration. The MIMO antennas 68(1), 68(2) are configured to be intra-cell bonded, meaning that both MIMO antennas 68(1), 68(2) within a given remote unit 34 are designed to be involved in communications with a particular client device 36 to provide MIMO communications with the particular client device 36. The MIMO splitter 64 in the remote unit 34 is an optical splitter since the received optical downlink MIMO communications signals 60D are optical signals. In each downlink communication path 66(1), 66(2), downlink optical-to-electrical converters 72D(1), 72D(2) are provided to convert the optical downlink MIMO communications signals 60D to electrical downlink MIMO communications signals 74D(1), 74D(2). The uplink path of the communications paths 66(1), 66(2) in the remote unit 34 is illustrated in FIG. 3B. As illustrated in FIG. 3B, uplink electrical-to-optical converters 72U(1), 72U(2) are also provided in the remote unit 34 to convert electrical uplink MIMO communications signals 74U(1), 74U(2) received from the client device 36 to optical uplink MIMO communications signals 60U(1), 60U(2) to be communicated over the uplink optical fiber 38U(1), 38U(2) to the central unit 32.

With reference back to FIG. 3A, the client device 36 includes two MIMO receivers 76(1), 76(2) that include MIMO receiver antennas 78(1), 78(2) also configured in MIMO configuration. The MIMO receiver antennas 78(1), 78(2) are configured to receive the electrical downlink MIMO communications signals 80D(1), 80D(2) wirelessly from the remote unit 34. Mixers 82(1), 82(2) are provided and coupled to the MIMO receiver antennas 78(1), 78(2) in the client device 36 to provide frequency conversion of the electrical downlink MIMO communications signals 80D(1), 80D(2). A local oscillator 84 is provided that is configured to provide oscillation signals 86(1), 86(2) to the mixers 82(1), 82(2), respectively, for frequency conversion. In this embodiment, the electrical downlink MIMO communications signals 80D(1), 80D(2) are down converted back to their native frequency as received by the central unit 32. The down converted electrical downlink MIMO communications signals 80D(1), 80D(2) are then provided to a signal analyzer 88 in the client device 36 for any processing desired.

Even with the potential doubling of bandwidth in the MIMO DAS 30 in FIGS. 3A and 3B, a client device 36 must still be within range of two MIMO antennas 68(1), 68(2) of a remote unit 34 to properly operate in MIMO configuration with increased bandwidth. Otherwise, the full benefits of increased bandwidth of MIMO technology provided in the MIMO DAS 30 may not be realized. Ensuring uniform MIMO coverage in coverage areas of the DAS 30 may be particularly important for newer cellular standards, such as Long Term Evolution (LTE), where increased bandwidth requirements are expected by users of client devices 36 in all coverage areas. Thus, it is desired to provide uniform coverage areas in the MIMO DAS 30, particularly in the edges of MIMO coverage cells.

Figure 2A:
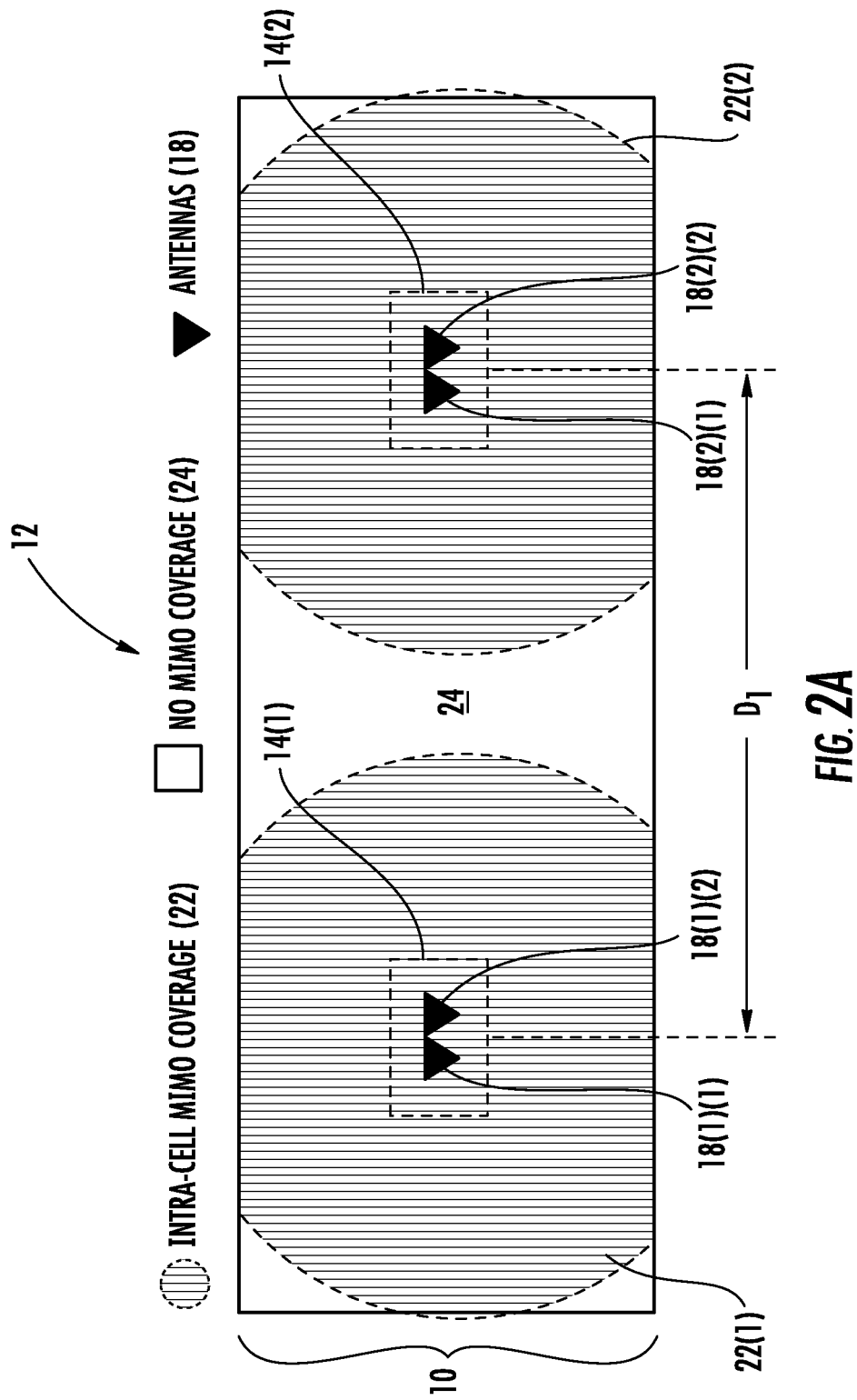
FIG. 2A illustrates a portion of MIMO coverage areas and non-MIMO coverage areas in a distributed communications system employing MIMO technology and intra-cell remote antenna unit bonding.
Figure 2B:
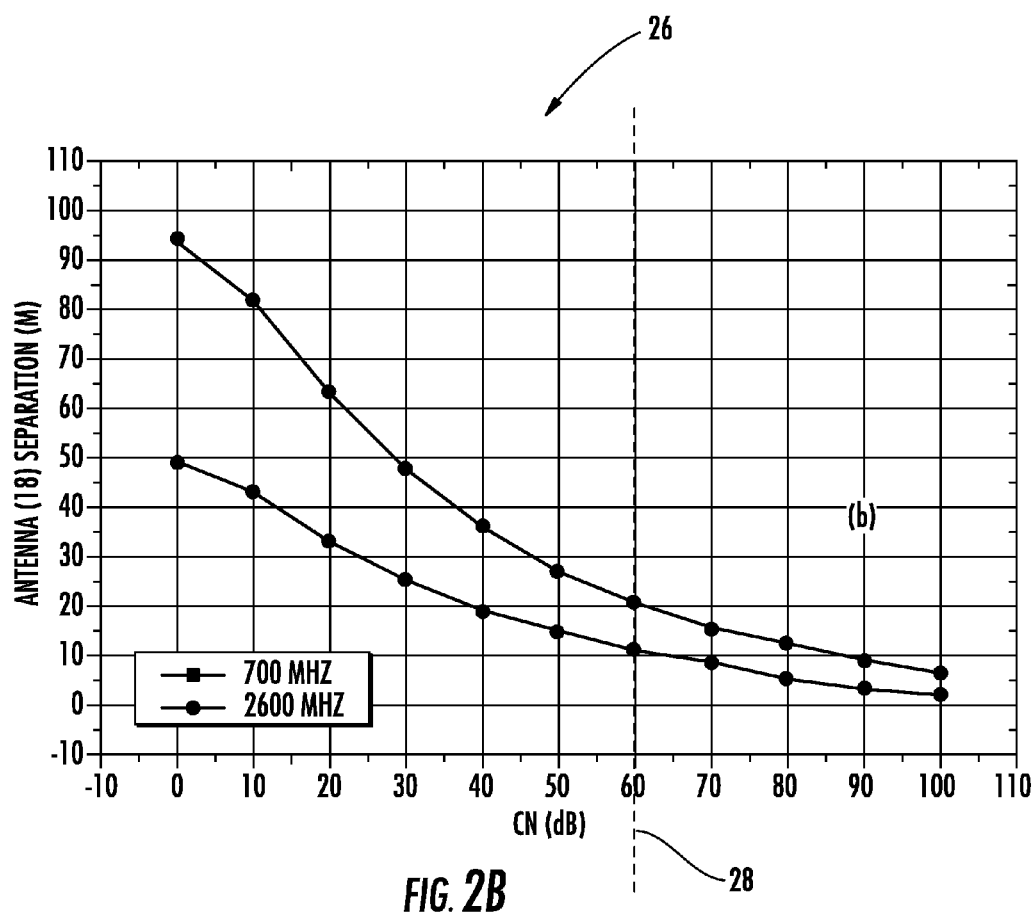
FIG. 2B is a graph illustrating one relationship between antenna separation of the remote units in FIG. 2A and MIMO condition number (CN) in decibels (dB).
Figure 4A:
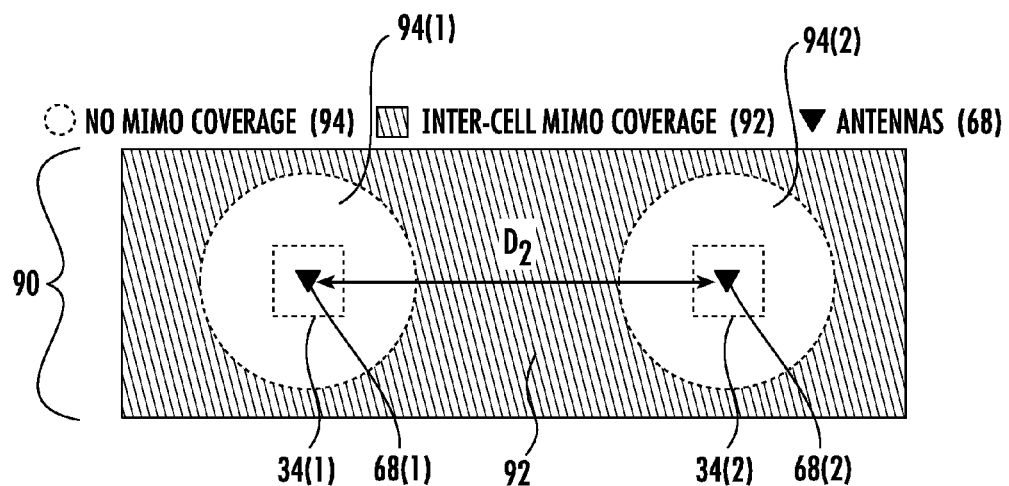
FIG. 4A illustrates a portion of MIMO coverage areas and non-MIMO coverage areas for a given distance between cell bonded antennas from adjacent remote units in the system in FIGS. 3A and 3B.

As discussed above with regard to FIGS. 2A and 2B, providing intra-cell remote unit antenna bonding in the DAS 30 in FIGS. 3A and 3B may still provide non-uniform MIMO coverage areas unless a high density of remote units 34 are provided, thereby increasing cost and complexity. FIG. 4A illustrates a portion of exemplary coverage areas 90 in the MIMO DAS 30 of FIGS. 3A and 3B when inter-cell remote unit antenna bonding is provided, as opposed to intra-cell antenna bonding. Inter-cell antenna bonding means that one MIMO antenna from one remote unit is selected to be paired with another antenna in a separate, neighboring remote unit to be involved with MIMO communication with a particular client device. In this manner, if a client device is located between the neighboring remote units such that the client device has acceptable and/or higher MIMO communications signal quality with two MIMO antennas provided in separate, neighboring remote units than a particular MIMO antenna pair in a single remote unit, the client device can enjoy the increased MIMO communication gain levels with inter-cell bonded MIMO antennas over intra-cell remote unit antenna bonding.

Referring to FIG. 4A, the coverage areas 90 are provided by two remote units 34(1), 34(2) separated at a distance $D_2$.

Only one of the MIMO antennas 68(1), 68(2) for each remote unit 34(1), 34(2) is illustrated, although there are two MIMO antennas 68 provided in each remote unit 34(1), 34(2). In this embodiment, to avoid non-uniform coverage areas for client devices 36, inter-cell antenna bonding of the MIMO antennas 68(1), 68(2) from the separate, neighboring remote units 34(1), 34(2) is provided. The inter-cell antenna bonding of the MIMO antennas 68(1), 68(2) provides a MIMO coverage area 92 as illustrated in FIG. 4A. However, providing this inter-cell bonding of the MIMO antennas 68(1), 68(2) in FIG. 4A will provide non-MIMO coverage areas 94(1), 94(2) as a result of power imbalance that occurs when the client device 36 is located close to one of the MIMO antennas 68(1), 68(2), and located farther away from the other inter-cell bonded MIMO antenna 68(2), 68(1), respectively.

Figure 4B:
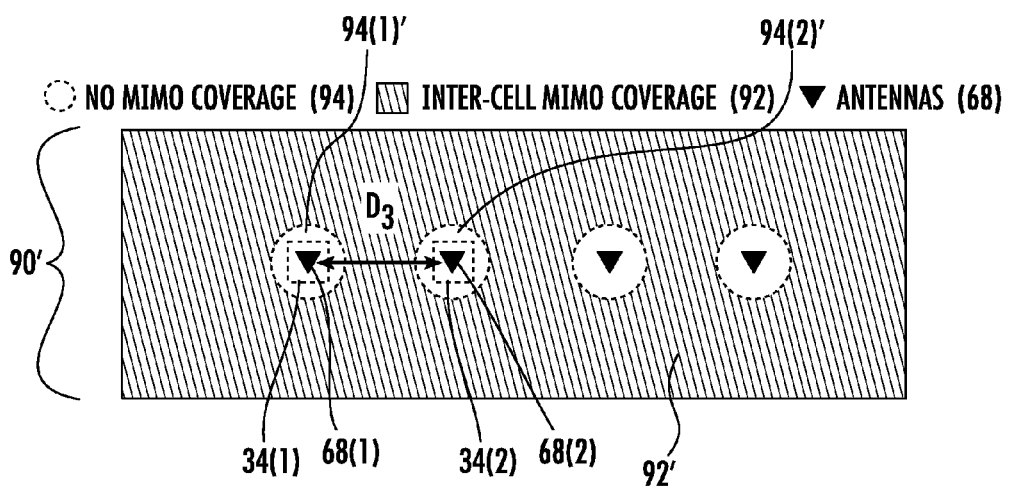
FIG. 4B illustrates a portion of MIMO coverage areas and non-MIMO coverage areas for a more dense distribution of remote units to provide a reduced distance between cell bonded antennas from neighboring remote units in the system in FIGS. 3A and 3B.

This power imbalance issue with inter-cell antenna bonding between the remote units 34(1), 34(2) in FIG. 4A can be reduced or minimized by providing the remote units 34(1), 34(2) closer to each other, as shown in FIG. 4B. As illustrated in FIG. 4B, the MIMO antennas 68(1), 68(2) of the remote units 34(1), 34(2) are separated at a distance $D_3$ from each other, which is less than $D_2$ in FIG. 4A. This configuration increases the MIMO coverage area 92' and reduces the non-MIMO coverage areas 94(1)', 94(2)', as illustrated in FIG. 4B. However, there are still non-MIMO coverage areas 94(1)', 94(2)' provided, which will reduce or not allow MIMO communications when client devices 36 are located in these non-MIMO coverage areas 94(1)', 94(2)'. The remote unit 34(1), 34(2) configuration in FIG. 4B is also more expensive, because a greater number of remote units 34 are required to provide communications coverage in the DAS 30 for a given desired coverage area.

Figure 4C:
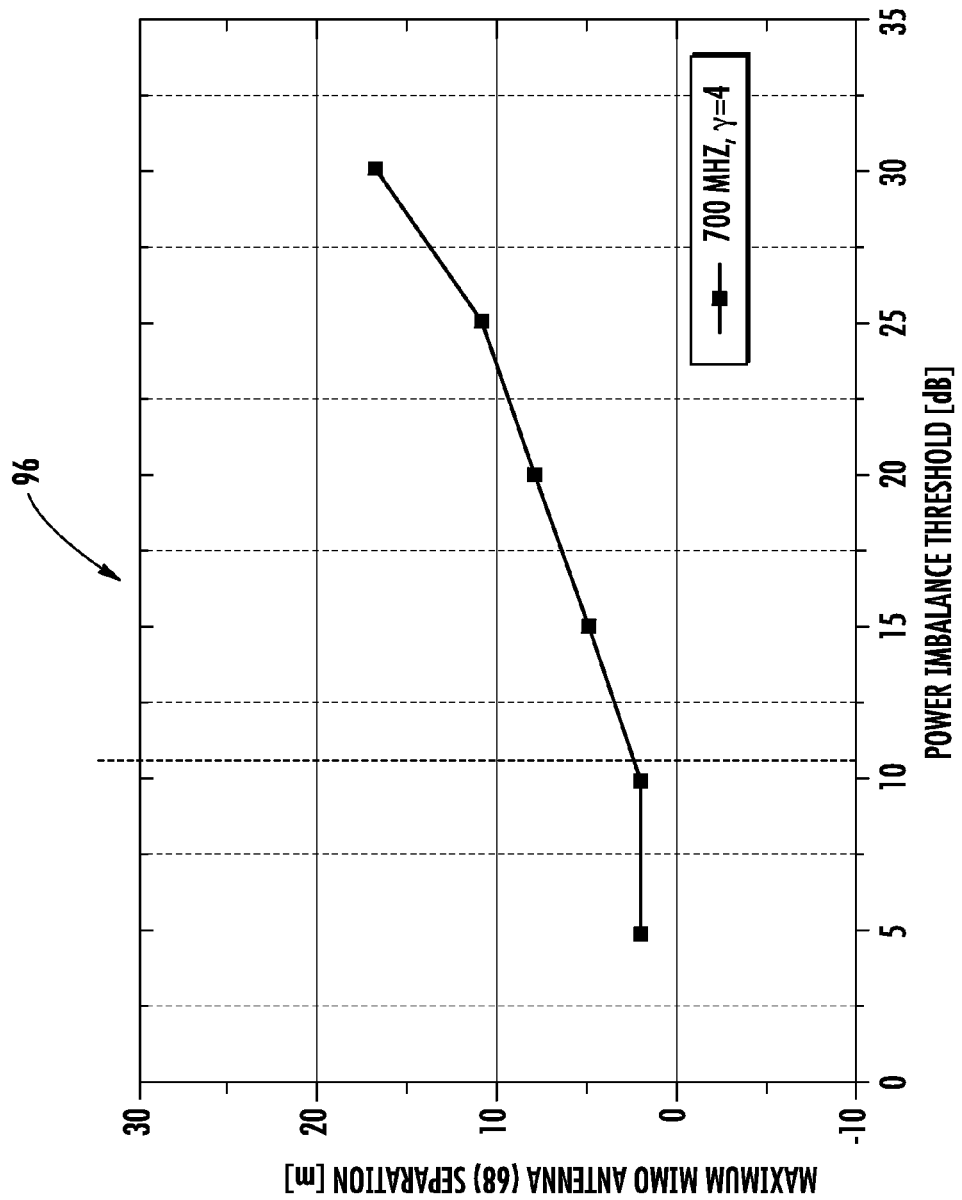
FIG. 4C is a graph illustrating an exemplary relationship between antenna separation of inter-cell bonded remote unit antennas in the system of FIGS. 3A and 3B and power imbalance threshold in decibels (dB).

FIG. 4C further illustrates the power imbalance issues as a result of inter-cell bonded remote units 34. FIG. 4C is an exemplary graph 96 illustrating an exemplary relationship between maximum antenna separation of inter-cell bonded remote units 34 in the MIMO DAS 30 of FIGS. 3A and 3B and power imbalance threshold in decibels (dB) at a 700 MHz communications frequency. As illustrated in FIG. 4C, for a maximum power imbalance of 12 dB, the maximum MIMO antenna 68 separation cannot exceed 3 meters (m) for inter-cell antenna bonding, which is an extremely dense arrangement of remote units 34.

Hybrid intra-cell/inter-cell remote unit antenna bonding in MIMO DASs enhance MIMO coverage areas in MIMO distributed antenna systems. If a client device has acceptable and/or higher MIMO communications signal quality with MIMO antennas within a single remote unit, intra-cell bonding of the MIMO antennas can be employed for MIMO communications to provide MIMO coverage to avoid power imbalance issues that may result with intra-cell bonded remote units. MIMO communications signal quality are a function of distance between a client device and MIMO antennas and quality degrades with distance due to degraded signal strength with distance. However, if a client device has acceptable and/or higher MIMO communications signal quality to MIMO antennas between at least one separate, neighboring remote unit, inter-cell bonding of the MIMO antennas can provide MIMO coverage that may not otherwise be available through intra-cell bonding.

FIG. 5 is a schematic diagram of exemplary hybrid intra-cell/inter-cell remote unit antenna bonding provided in a MIMO DAS 30' that is adapted from the MIMO DAS 30 in FIGS. 3A and 3B. Common components between the MIMO DAS 30 and 30' include common numbering in FIG. 5, and will not be re-described in detail.

As illustrated in FIG. 5, a plurality of remote units 34(1)-34(6) are provided in the MIMO DAS 30'. Client devices 36(1)-36(3) are located in the MIMO DAS 30' and are configured to receive and transmit wireless MIMO communications signals with the DAS 30' via the remote units 34(1)-34(6). The client device 36(1) is located closer to both MIMO antennas 68(1) in the remote unit 34(1) than any MIMO antennas 68 in any separate, neighboring remote unit 34(2) or 34(4). Thus, intra-cell remote unit antenna bonding is provided for the MIMO antennas 68(1)(1), 68(1)(2) of remote unit 34(1) for MIMO communications with the client device 36(1). In other words, MIMO antennas 68(1)(1), 68(1)(2) within the single remote unit 34(1) are configured to provide MIMO communications for the client device 36(1) as opposed to another MIMO antenna 68 from another neighboring remote unit 34 being configured to provide the MIMO communications for client device 34(1). Similarly, intra-cell remote unit antenna bonding is provided for the MIMO antennas 68(5)(1), 68(5)(2) of remote unit 34(5) for MIMO communications with the client device 36(3).

With continuing reference to FIG. 5, inter-cell remote unit antenna bonding is provided for MIMO communications for client device 36(2). Because the client device 36(2) has acceptable and/or higher MIMO communications signal quality (e.g., that exceeds a MIMO communications signal quality threshold) with MIMO antennas 68(4)(2) and 68(5)(1) than MIMO antenna pairs 68(4)(1), 68(4)(2) or 68(5)(1), 68(5)(2), the DAS 30' is configured to inter-cell bond MIMO antennas 68(4)(2) and 68(5)(1) for MIMO communications with client device 36(2).

Figures 6A, 6B:
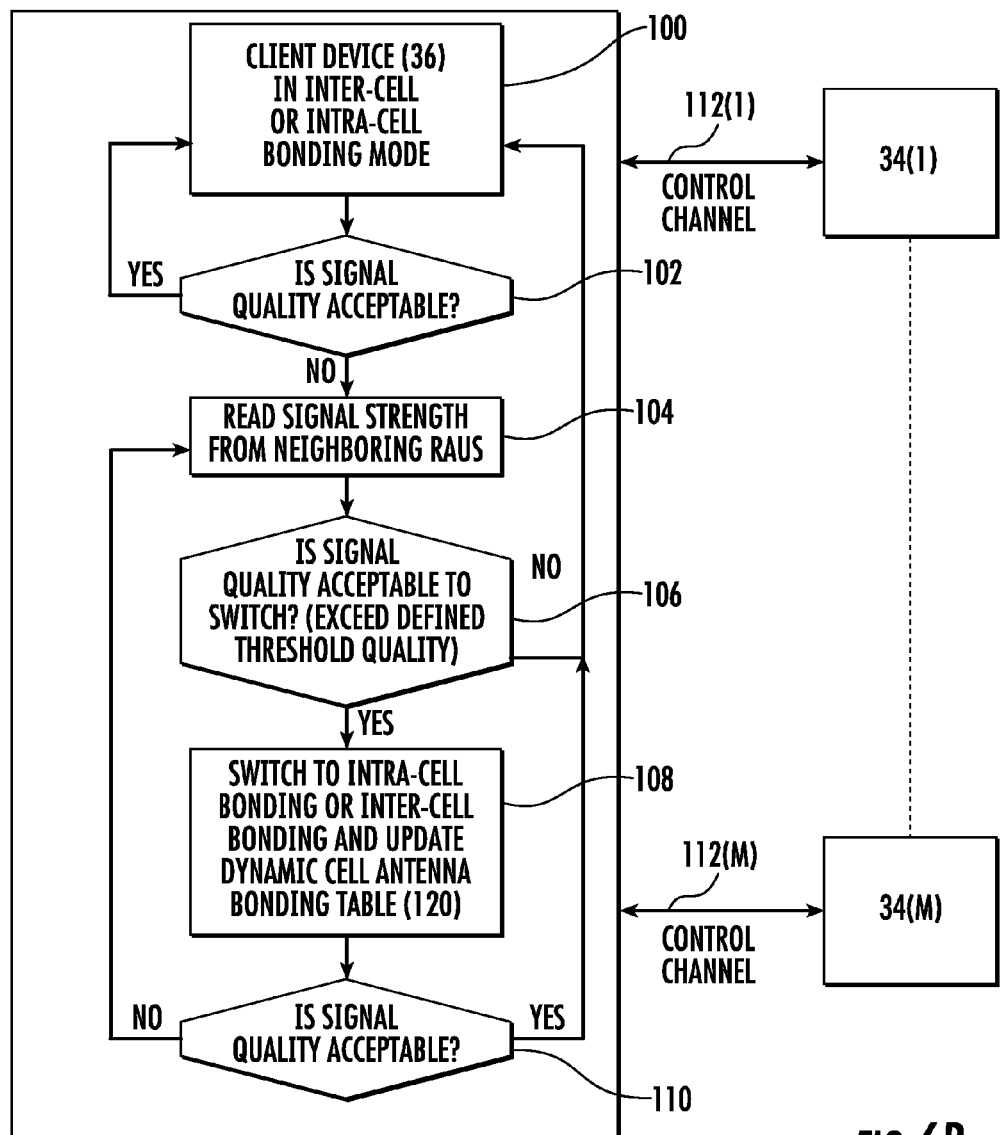
FIG. 6A is a flowchart illustrating a process for hybrid intra-cell/inter-cell remote unit antenna bonding for client devices in the system of FIG. 5.
FIG. 6B is a schematic diagram illustrating interfaces for the process in FIG. 6A for providing intra-cell and inter-cell remote unit antenna bonding for MIMO communications in the system of FIG. 5.

FIG. 6A is a flowchart illustrating an exemplary process for hybrid intra-cell/inter-cell remote unit antenna bonding for client devices 36 in the MIMO DAS 30' of FIG. 5. FIG. 6B is a schematic diagram illustrating exemplary interfaces for the process in FIG. 6A for providing intra-cell and intra-cell antenna bonding of remote units 34 for MIMO communications with client devices 36 in the MIMO DAS 30' of FIG. 5. As will be discussed in more detail below, this process determines whether MIMO communication requested by client devices 36 in the MIMO DAS 30' should be provided using intra-cell or inter-cell remote unit antenna bonding and with which remote unit 34 or remote units 34. MIMO coverage can be provided to provide acceptable MIMO communications signal quality, if possible, based on both intra-cell and inter-cell antenna bonding without having to compromise between only providing one or the other type of antenna bonding for MIMO coverage. The process is capable of dynamically adjusting whether intra-cell or inter-cell remote unit antenna bonding is employed for MIMO communications with a client device 36 based on the MIMO communications signal qualities of received MIMO communications signals by MIMO antennas 68 in the remote units 34 in the MIMO DAS 30'. It is contemplated that the exemplary hybrid intra-cell/inter-cell remote unit antenna bonding process will be carried out by the central unit 32 provided in the MIMO DAS 30' in FIG. 5. However, the exemplary hybrid intra-cell/inter-cell remote unit antenna bonding could also be carried out in other components of the DAS 30'.

The process illustrated in FIGS. 6A and 6B is described with respect to one client device 36 and the central unit 32 performing the process. However, it should be noted that the process therein can be performed by other devices other than the central unit 32 and for all client devices 36 communication with remote units 34 in the DAS 30'. The process involves a client device 36 communicating with MIMO antennas 68 of one or more remote units 34 that are either intra-cell bonded or inter-cell bonded (block 100). For example, a new MIMO communication session with a client device 36 may default to intra-cell antenna bonding with one remote unit 34 as a non-limiting example. The identification of MIMO antennas 68 assigned or associated with MIMO communications with particular client devices 36 can be stored in a dynamic cell antenna bonding table 120, as illustrated in FIG. 7. The central unit 32 can consult the dynamic cell antenna bonding table 120 to determine a cell bonding mode for remote units 34 and client devices 36, as well as storing updated cell bonding modes when switched for remote units 34 and client devices 36 according to the process in FIGS. 6A and 6B. For example, the cell bonding mode and the identification of remote units 34 bonded to a client device 36 are used to determine which MIMO antennas 68 are associated with MIMO communications with a particular client device 36 so that the correct MIMO communications signals can be associated with communications with a particular client device 36, such as by the central unit 32 or a network coupled to the central unit 32.

With reference to FIG. 7, the dynamic cell antenna bonding table 120 stores a client device identification 122 identifying client devices 36 associated or bonded in MIMO communications with one or more remote units identifications 124 identifying remote unit 34. For example, as illustrated in FIG. 7, client device 1 36(1) is only associated with remote unit 1 34(1); thus client device 1 36(1) is intra-cell antenna bonded with remote unit 1 34(1) as noted by the notation in the cell bonding mode 126 associated with client device 1 36(1). However, client device 3 36(3) is inter-cell antenna bonded with remote unit 1 34(1) and remote unit 2 34(2), as noted by the notation in the cell bonding mode 126 associated with client device 3 36(3). Client device 3 36(3) is associated with remote units 1 34(1) and remote unit 34(2) in the dynamic cell antenna bonding table 120, as illustrated in FIG. 7.

With reference back to FIGS. 6A and 6B, the MIMO communications signal quality between the bonded MIMO antennas 68 and the client device 36 are measured and analyzed to determine if the MIMO communications signals have acceptable signal quality (block 102). This step is performed to determine if the current cell-bonding mode of a client device 36 is sufficient to provide MIMO communications, examples of which have been previously described. Signal strength may be used to determine the MIMO communications signal quality is of acceptable quality, as a non-limiting example. Further, this step may involve determining if the MIMO communications signal strength exceeds a predefined MIMO communications signal quality threshold. Other measuring and analysis techniques other than signal strength may also be employed to determine MIMO communications signal quality. The central unit 32 in this embodiment is configured to receive signal quality information from the remote units 34(1)-34(M) via control channels 112(1)-112(M), as illustrated in FIG. 6B. If MIMO communications signal quality is acceptable or higher than current signal quality with a current cell bonding mode, the process repeats backs to block 100 by the client device 36 continuing to perform MIMO communications in its current cell bonding mode with the associated remote units 34 as indicated in the dynamic cell antenna bonding table 120 (in FIG. 7) as long as communications signal quality with the current cell bonding configuration is acceptable (block 102). This step may involve determining if the MIMO communications signal strength exceeds a predefined MIMO communications signal quality threshold. An example where communications signal quality with the current cell bonding configuration may no longer be acceptable is when the client device 34 moves from its current location to another location in the MIMO DAS 30' in closer proximity to another remote unit(s) 34.

With continuing reference to FIGS. 6A and 6B, if the communications signal quality with the client device 36 is not of acceptable quality with the current cell bonding mode and antenna bonding configuration for the client device 36 (block 102), the process involves determining of the cell bonding mode and antenna bonding configuration can be switched to maintain acceptable MIMO communications. The communications signal strengths are read from neighboring remote units 34 to the remote unit 34 current associated and bonded to the client device 36 (block 104). The dynamic cell-bonding table 120 in FIG. 7 can be consulted to determine which remote units 34 are bonded to the client device 36. A remote unit\mapping table 130 in FIG. 8 can be employed to determine which remote units 34 are neighboring to the remote unit(s) 34 bonded to the client device 36. The remote unit mapping table 130 in FIG. 8 stores a list of neighboring remote units 34 (132) with each remote unit 34 identified by a remote unit identification 134 in the remote unit static table 130. The remote unit mapping table 130 in FIG. 8 may be contain remote unit mappings if the remote unit mapping table 130 is configured at setup or initialization of the MIMO DAS 30' depending on the configuration and layout of the remote units 34.

With continuing reference to FIGS. 6A and 6B, after the neighboring remote units 34 are identified, the signal quality of MIMO communications signals between the neighboring remote units 34 and the client device 36 are measured and analyzed to determine if of acceptable signal quality (block 106). For example, this step may involve determining if the MIMO communications signal strength between the neighboring remote units 34 and the client device 36 exceeds a predefined MIMO communications signal quality threshold. If the signal quality of communications signals between the neighboring remote units 34 and the client device 36 are determined to be of acceptable signal quality (block 106), the central unit 32 switches the cell bonding mode for the client device 36 by updating the dynamic cell antenna bonding table 120 in FIG. 7 with the new remote unit(s) 34 assigned to be associated or bonded with the client device 36 for MIMO communications (block 108). The client device 36 continues to communicate in the new cell-bonding mode and communications signal quality acceptability is checked (block 110). If not acceptable, the process goes to block 104 described above, in which the cell bonding mode may be switched for the client device 36 and/or different remote units 34 associated or bonded with the client device 36 employing either intra-cell antenna bonding or inter-cell antenna bonding depending on MIMO communications signal quality acceptability.

Figure 9:
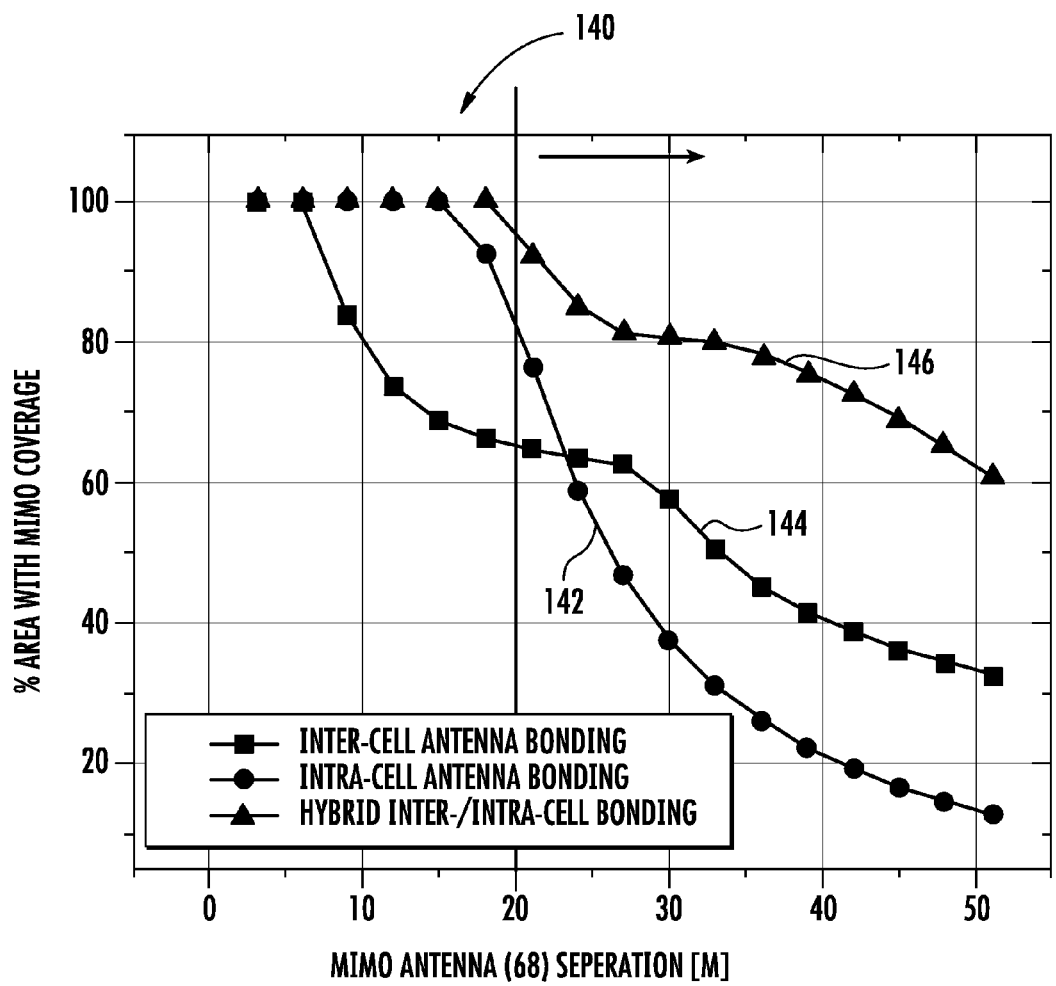
FIG. 9 is a graph of MIMO communications service performance in terms of percentage area of MIMO coverage for antenna separations for intra-cell bonded remote unit antennas, inter-cell bonded remote unit antennas, and hybrid intra-cell/inter-cell bonded remote unit antennas in the MIMO system of FIG. 5.

FIG. 9 illustrates exemplary MIMO communications performance of hybrid intra-cell/inter-cell remote unit antenna bonding. FIG. 9 is an exemplary graph 140 illustrating exemplary MIMO communications service performance in terms of percentage area of MIMO coverage for MIMO antenna 68 separations for three scenarios: (1) only intra-cell remote unit antenna bonding; (2) only inter-cell remote unit antenna bonding; and (3) hybrid intra-cell/inter-cell remote unit antenna bonding in the MIMO DAS 30' of FIG. 5. MIMO coverage curve 142 illustrates an exemplary percentage area of MIMO coverage for a given MIMO antenna 68 separation distance in the DAS 30' in FIG. 5 when only intra-cell antenna bonding is employed. MIMO coverage curve 144 illustrates an exemplary percentage area of MIMO coverage for a given MIMO antenna 68 separation distance in the DAS 30' in FIG. 5 when only inter-cell antenna bonding is employed. MIMO coverage curve 146 illustrates an exemplary percentage area of MIMO coverage for a given MIMO antenna 68 separation distance in the DAS 30' in FIG. 5 when hybrid intra-cell/inter-cell antenna bonding is employed, including as provided in the embodiments described herein.

With continuing reference to FIG. 9, for inter-cell antenna bonding, a MIMO power imbalance threshold of 12 dB and condition number of 20 dB is assumed. For intra-cell antenna bonding, a typical MIMO condition number of 60 dB is assumed. FIG. 9 shows that for extremely dense deployments (e.g., <10 m), intra-cell antenna bonding alone and inter-cell antenna bonding alone could provide sufficient MIMO coverage. However, when remote unit deployments with greater separation (e.g., >20 m) are considered, the proposed hybrid intra-cell/inter-cell antenna bonding according to the present embodiments may provide greater than 20% higher MIMO coverage than through only intra-cell antenna bonding or only inter-cell antenna bonding.

Figure 1:
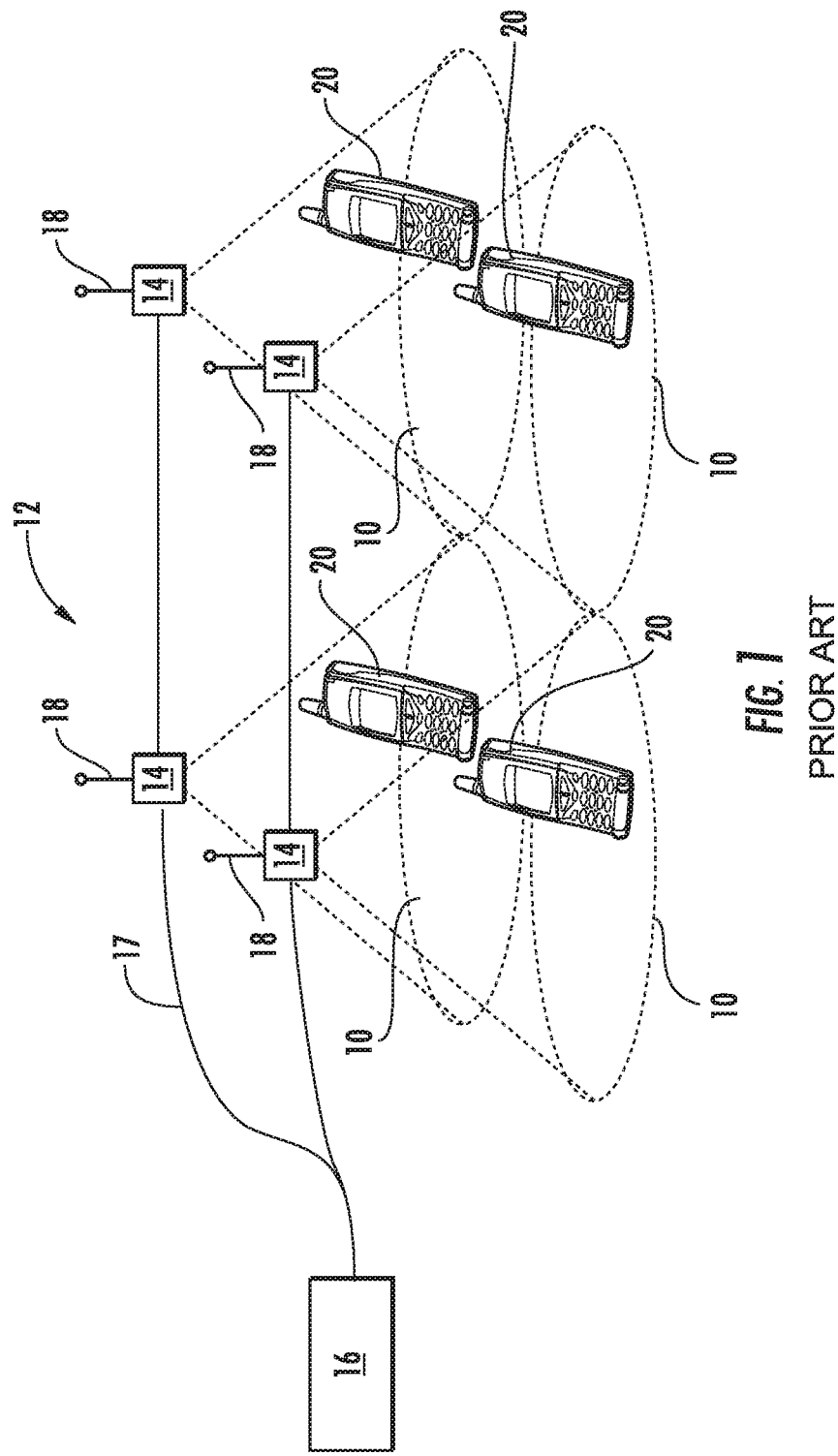
FIG. 1 is a schematic diagram of a distributed communications system capable of distributing wireless communications services to client devices.

Note that although the MIMO distributed antenna systems described above allow for distribution of radio frequency (RF) communications signals, the MIMO distributed antenna systems described above are not limited to distribution of RF communications signals. Data communications signals, including digital data signals, for distributing data services could also be distributed in the MIMO DAS in lieu of, or in addition to, RF communications signals. Also note that while the MIMO DASs in FIG. 1 described above include distribution of communications signals over optical fiber, these MIMO DASs are not limited to distribution of communications signals over optical fiber. Distribution media could also include, coaxial cables, twisted-pair conductors, wireless transmission and reception, and combinations thereof. Also, any combination can be employed that also involves optical fiber for portions of the DAS.

It may also be desired to provide high-speed wireless digital data service connectivity with remote units in the MIMO DASs disclosed herein. One example would be WiFi. WiFi was initially limited in data rate transfer to 12.24 Mb/s and is now provided at data transfer rates of up to 54 Mb/s using WLAN frequencies of 2.4 GHz and 5.8 GHz. While interesting for many applications, WiFi has proven to have too small a bandwidth to support real time downloading of uncompressed high definition (HD) television signals to wireless client devices. To increase data transfer rates, the frequency of wireless signals could be increased to provide larger channel bandwidth. For example, an extremely high frequency in the range of 30 GHz to 300 GHz could be employed. For example, the sixty (60) GHz spectrum is an EHF that is an unlicensed spectrum by the Federal Communications Commission (FCC) and that could be employed to provide for larger channel bandwidths. However, high frequency wireless signals are more easily attenuated or blocked from traveling through walls or other building structures where DASs are installed.

Thus, the embodiments disclosed herein can include distribution of extremely high frequency (EHF) (i.e., approximately 30—approximately 300 GHz), as a non-limiting example. The MIMO DASs disclosed herein can also support provision of digital data services to wireless clients. The use of the EHF band allows for the use of channels having a higher bandwidth, which in turn allows more data intensive signals, such as uncompressed HD video to be communicated without substantial degradation to the quality of the video. As a non-limiting example, the DASs disclosed herein may operate at approximately sixty (60) GHz with approximately seven (7) GHz bandwidth channels to provide greater bandwidth to digital data services. The DASs disclosed herein may be well suited to be deployed in an indoor building or other facility for delivering digital data services.

It may be desirable to provide MIMO DASs, according to the embodiments disclosed herein, that provide digital data services for client devices. For example, it may be desirable to provide digital data services to client devices located within a DAS. Wired and wireless devices may be located in the building infrastructures that are configured to access digital data services. Examples of digital data services include, but are not limited to, Ethernet, WLAN, WiMax, WiFi, DSL, and LTE, etc. Ethernet standards could be supported, including 100 Mb/s (i.e., fast Ethernet) or Gigabit (Gb) Ethernet, or ten Gigabit (10G) Ethernet. Examples of digital data services include, wired and wireless servers, wireless access points (WAPs), gateways, desktop computers, hubs, switches, remote radio heads (RRHs), baseband units (BBUs), and femtocells. A separate digital data services network can be provided to provide digital data services to digital data client devices.

Figure 10:
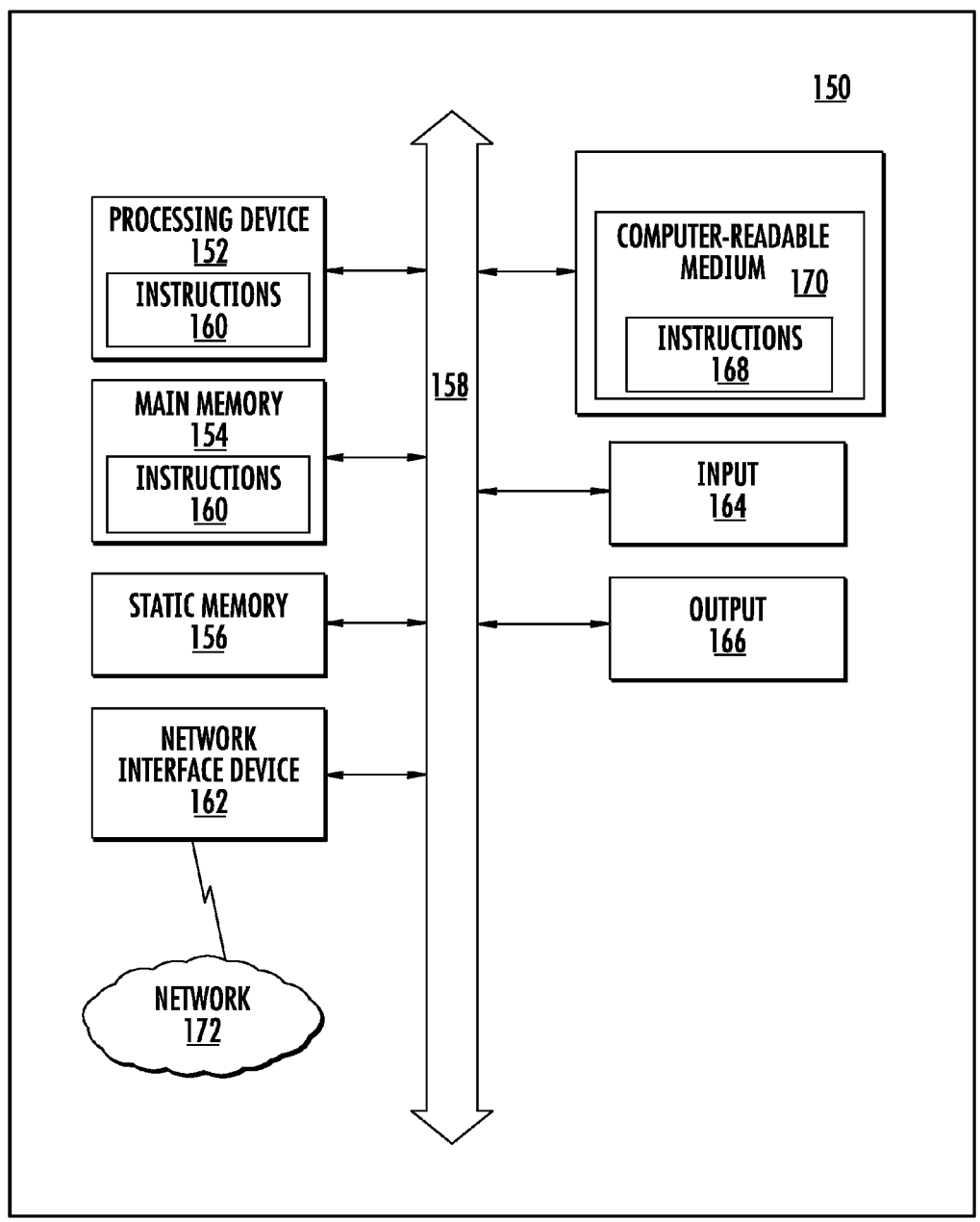
FIG. 10 is a schematic diagram of a generalized representation of a controller.

FIG. 10 is a schematic diagram representation of additional detail illustrating components that could be employed in any of the components or devices disclosed herein or in the MIMO distributed communication systems described herein, if adapted to execute instructions from an exemplary computer-readable medium to perform any of the functions or processing described herein. For example, the processes described in FIGS. 6A and 6B above could be provided as a result of executing instructions from a computer-readable medium. Such component or device may include a computer system 150 within which a set of instructions for performing any one or more of the location services discussed herein may be executed. The computer system 150 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 150 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 150 in this embodiment includes a processing device or processor 152, a main memory 154 (e.g., read-only memory (ROM), flash memory, dynamic random access memory (DRAM), such as synchronous DRAM (SDRAM), etc.), and a static memory 156 (e.g., flash memory, static random access memory (SRAM), etc.), which may communicate with each other via a data bus 158. Alternatively, the processing device 152 may be connected to the main memory 154 and/or static memory 156 directly or via some other connectivity means. The processing device 152 may be a controller, and the main memory 154 or static memory 156 may be any type of memory.

The processing device 152 represents one or more general-purpose processing devices, such as a microprocessor, central processing unit, or the like. More particularly, the processing device 152 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 152 is configured to execute processing logic in instructions 160 for performing the operations and steps discussed herein.

The computer system 150 may further include a network interface device 162. The computer system 150 also may or may not include an input 164, configured to receive input and selections to be communicated to the computer system 150 when executing instructions. The computer system 150 also may or may not include an output 166, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 150 may or may not include a data storage device that includes instructions 168 stored in a computer-readable medium 170. The instructions 168 may also reside, completely or at least partially, within the main memory 154 and/or within the processing device 152 during execution thereof by the computer system 150, the main memory 154 and the processing device 152 also constituting computer-readable medium. The instructions 168 may further be transmitted or received over a network 172 via the network interface device 162.

While the computer-readable medium 170 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical and magnetic medium, and carrier wave signals.

The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); a machine-readable transmission medium (electrical, optical, acoustical, or other form of propagated signals (e.g., carrier waves, infrared signals, digital signals, etc.)); and the like.

Unless specifically stated otherwise and as apparent from the previous discussion, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language.

The logical blocks, modules, circuits, and algorithms described in connection with the embodiments disclosed herein may be implemented as electronic hardware, instructions stored in memory or in another computer-readable medium and executed by a processor or other processing device, or combinations of both. The components of the DASs described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality.

The logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices.

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium. An exemplary storage medium is coupled to the processor such that the processor can read information from, and write information to, the storage medium. In the alternative, the storage medium may be integral to the processor. The processor and the storage medium may reside in an ASIC, which may reside in a remote station. The processor and the storage medium may also reside as discrete components in a remote station, base station, or server.

The operations or steps described may be performed in numerous different sequences other than the illustrated sequences. Furthermore, operations described in a single operational step may be performed in a number of different steps, and one or more operational steps may be combined. Information and signals may be represented using any of a variety of technologies and techniques. For example, data, instructions, commands, information, signals, bits, symbols, and chips, that may be referenced throughout the above description, may be represented by voltages, currents, electromagnetic waves, magnetic fields, or particles, optical fields or particles, or any combination thereof As used herein, it is intended that terms "fiber optic cables" and/or "optical fibers" include all types of single mode and multi-mode light waveguides, including one or more optical fibers that may be upcoated, colored, buffered, ribbonized, and/or have other organizing or protective structure in a cable such as one or more tubes, strength members, jackets, or the like.

Many modifications and other embodiments of the embodiments set forth herein will come to mind to one skilled in the art to which the embodiments pertain, and having the benefit of the teachings presented in the forgoing descriptions and the associated drawings. Therefore, it is to be understood that the description and claims are not to be limited to the specific embodiments disclosed, and that modifications and other embodiments are intended to be included within the scope of the appended claims.

What is claimed is:

1. A method of providing hybrid intra-cell/inter-cell remote unit antenna bonding for multiple-input, multiple-output (MIMO) communications with a client device in a MIMO distributed antenna system, comprising:
    configuring intra-cell antenna bonding for intra-cell MIMO communications for a client device in a first remote unit in the MIMO distributed antenna system such that the client device communicates with a first MIMO antenna and a second MIMO antenna in the first remote unit in an intra-cell MIMO communications session;
    receiving intra-cell antenna bonded MIMO communications signals from the client device at the first MIMO antenna and the second MIMO antenna in the first remote unit in the intra-cell MIMO communications session;
    determining if the received intra-cell antenna bonded MIMO communications signals received by the first MIMO antenna and the second MIMO antenna of the first remote unit from the client device exceed a threshold MIMO communications signal quality; and
    if the received intra-cell antenna bonded MIMO communications signals received by the first MIMO antenna and the second MIMO antenna of the first remote unit from the client device do not exceed the threshold MIMO communications signal quality:
        receiving MIMO communications signals from the client device at a neighboring MIMO antenna of at least one neighboring remote unit to the first remote unit;
        determining if the received MIMO communications signals received by the neighboring MIMO antenna of the at least one neighboring remote unit from the client device exceed a threshold MIMO communications signal quality; and
        if the received MIMO communications signals received by the neighboring MIMO antenna of the at least one neighboring remote unit from the client device exceed the threshold MIMO communications signal quality, configuring inter-cell antenna bonding for inter-cell MIMO communications for the client device in the at least one neighboring remote unit in the MIMO distributed antenna system such that the client device communicates with the neighboring MIMO antenna in the at least one neighboring remote unit and at least one MIMO antenna among the first MIMO antenna and the second MIMO antenna in the first remote unit in an inter-cell MIMO communications session.

2. The method of claim 1, wherein if the received MIMO communications signals at a neighboring MIMO antenna of the at least one neighboring remote unit from the client device do not exceed the threshold MIMO communications signal quality, retaining the intra-cell antenna bonding for intra-cell MIMO communications for the client device in the first remote unit.

3. The method of claim 1, further comprising:
    receiving MIMO communications signals from the client device at the neighboring MIMO antenna of the at least one neighboring remote unit and the at least one MIMO antenna among the first MIMO antenna and the second MIMO antenna in the first remote unit;
    determining if the received MIMO communications signals by the neighboring MIMO antenna of the at least one neighboring remote unit from the client device exceed a threshold MIMO communications signal quality; and
    if the received MIMO communications signals by the neighboring MIMO antenna of the at least one neighboring remote unit from the client device exceed the threshold MIMO communications signal quality, retaining inter-cell antenna bonding for inter-cell MIMO communications for the client device by the neighboring MIMO antenna of the at least one neighboring remote unit and the at least one MIMO antenna among the first MIMO antenna and the second MIMO antenna in the first remote in the at least one neighboring remote unit.

4. The method of claim 1, further comprising:
    receiving MIMO communications signals from the client device at the neighboring MIMO antenna of the at least one neighboring remote unit and the at least one MIMO antenna among the first MIMO antenna and the second MIMO antenna in the first remote unit;
    determining if the received MIMO communications signals by the neighboring MIMO antenna of the least one neighboring remote unit from the client device exceed a threshold MIMO communications signal quality; and
    if the received MIMO communications signals by the neighboring MIMO antenna of the at least one neighboring remote unit from the client device do not exceed the threshold MIMO communications signal quality, configuring intra-cell antenna bonding for intra-cell MIMO communications for the client device with the first MIMO antenna and the second MIMO antenna in the first remote unit.

5. The method of claim 1, further comprising:
    receiving MIMO communications signals from the client device at the neighboring MIMO antenna of at least one other neighboring remote unit to the at least one neighboring remote unit;
    determining if the received MIMO communications signals by the neighboring MIMO antenna of the at least one other neighboring remote unit from the client device exceed a threshold MIMO communications signal quality; and
    if the received MIMO communications signals by the neighboring MIMO antenna of the at least one other neighboring remote unit from the client device exceed the threshold MIMO communications signal quality, configuring inter-cell antenna bonding for MIMO communications for the client device with the at least one other neighboring remote unit in the MIMO distributed antenna system such that the client device communicates with the neighboring MIMO antenna of the at least one other neighboring remote unit and at least one neighboring MIMO antenna of the at least one other neighboring remote unit in an inter-cell MIMO communications session.

6. The method of claim 1, further comprising determining if the received intra-cell antenna bonded MIMO communications signals by the first MIMO antenna and the second MIMO antenna of the first remote unit from the client device exceed a threshold MIMO communications signal strength.

7. The method of claim 1, further comprising determining if the received MIMO communications signals at the at least one neighboring remote unit from the client device exceed a threshold MIMO communications signal strength.

8. The method of claim 1, further comprising storing the intra-cell antenna bonding for the intra-cell MIMO communications for the client device at a first remote unit in a dynamic cell antenna bonding table.

9. The method of claim 1, further comprising storing the inter-cell antenna bonding for the inter-cell MIMO communications for the client device at the at least one neighboring remote unit in a dynamic cell antenna bonding table if the received MIMO communications signals by the at least one neighboring MIMO antenna of the at least one neighboring remote unit from the client device exceed the threshold MIMO communications signal quality.

10. The method of claim 1, further comprising identifying the at least one neighboring remote unit to the first remote unit from a remote unit mapping table.

11. A controller for providing hybrid intra-cell/inter-cell remote unit antenna bonding for multiple-input, multiple-output (MIMO) communications with a client device in a MIMO distributed antenna system, wherein the controller is configured to:
configure intra-cell antenna bonding for MIMO communications for a client device in a first remote unit in the MIMO distributed antenna system such that the client device communicates with a first MIMO antenna and a second MIMO antenna in the first remote unit in an intra-cell MIMO communications session;
receive intra-cell antenna bonded MIMO communications signals from the client device at the first MIMO antenna and the second MIMO antenna in the first remote unit in the intra-cell MIMO communications session;
determine if the received intra-cell antenna bonded MIMO communications signals received by the first MIMO antenna and the second MIMO antenna of the first remote unit from the client device exceed a threshold MIMO communications signal quality; and
if the received intra-cell antenna bonded MIMO communications signals received by the first MIMO antenna and the second MIMO antenna of the first remote unit from the client device do not exceed the threshold MIMO communications signal quality:
receive MIMO communications signals from the client device at a neighboring MIMO antenna of at least one neighboring remote unit to the first remote unit;
determine if the received MIMO communications signals received by the neighboring MIMO antenna of the at least one neighboring remote unit from the client device exceed a threshold MIMO communications signal quality; and
if the received MIMO communications signals received by the neighboring MIMO antenna of the at least one neighboring remote unit from the client device exceed the threshold MIMO communications signal quality, configure inter-cell antenna bonding for inter-cell MIMO communications for the client device in the at least one neighboring remote unit in the MIMO distributed antenna system such that the client devices communicates with the neighboring MIMO antenna in the neighboring remote unit and at least one MIMO antenna among the first MIMO antenna and the second MIMO antenna in the first remote unit in an inter-cell MIMO communications session.

12. The controller of claim 11, wherein if the received MIMO communications signals at a neighboring MIMO antenna of the at least one neighboring remote unit from the client device do not exceed the threshold MIMO communications signal quality, the controller is further configured to retain the intra-cell antenna bonding for intra-cell MIMO communications for the client device in the first remote unit.

13. The controller of claim 11, further configured to:
receive MIMO communications signals from the client device at the neighboring MIMO antenna of the at least one neighboring remote unit and the at least one MIMO antenna among the first MIMO antenna and the second MIMO antenna in the first remote unit;
determine if the received MIMO communications signals by the neighboring MIMO antenna of the at least one neighboring remote unit from the client device exceed a threshold MIMO communications signal quality; and
if the received MIMO communications signals by the neighboring MIMO antenna of the at least one neighboring remote unit from the client device exceed the threshold MIMO communications signal quality, retain inter-cell antenna bonding for inter-cell MIMO communications for the client device by the neighboring MIMO antenna of the at least one neighboring remote unit and the at least one MIMO antenna among the first MIMO antenna and the second MIMO antenna in the first remote unit in the at least one neighboring remote unit.

14. The controller of claim 11, further configured to:
receive MIMO communications signals from the client device at the neighboring MIMO antenna of the at least one neighboring remote unit and the at least one MIMO antenna among the first MIMO antenna and the second MIMO antenna in the first remote unit;
determine if the received MIMO communications signals by the neighboring MIMO antenna of the at least one neighboring remote unit from the client device exceed a threshold MIMO communications signal quality; and
if the received MIMO communications signals by the neighboring MIMO antenna of the at least one neighboring remote unit from the client device do not exceed the threshold MIMO communications signal quality, configure intra-cell antenna bonding for intra-cell MIMO communications for the client device with the first MIMO antenna and the second MIMO antenna in the first remote unit.

15. The controller of claim 11, further configured to:
receive MIMO communications signals from the client device at the neighboring MIMO antenna of at least one other neighboring remote unit to the at least one neighboring remote unit;
determine if the received MIMO communications signals by the neighboring MIMO antenna of the at least one other neighboring remote unit from the client device exceed a threshold MIMO communications signal quality; and if the received MIMO communications signals by the neighboring MIMO antenna of the at least one other neighboring remote unit from the client device exceed the threshold MIMO communications signal quality, configure inter-cell antenna bonding for MIMO communications for the client device with the at least one other neighboring remote unit in the MIMO distributed antenna system such that the client device communicates with the neighboring MIMO antenna of the at least one other neighboring remote unit and at least one neighboring MIMO antenna of the at least one other neighboring remote unit in an inter-cell MIMO communications session.

16. The controller of claim 11, configured to determine if the received intra-cell antenna bonded MIMO communications signals by the first MIMO antenna and the second MIMO antenna of the first remote unit from the client device exceed a threshold MIMO communications signal strength.

17. The controller of claim 11, configured to determine if the received MIMO communications signals at the at least one neighboring remote unit from the client device exceed a threshold MIMO communications signal strength.

18. The controller of claim 11, configured to store the intra-cell antenna bonding for the intra-cell MIMO communications for the client device at the first remote unit in a dynamic cell antenna bonding table.

19. The controller of claim 11, configured to store the inter-cell antenna bonding for the inter-cell MIMO communications for the client device at the at least one neighboring remote unit in a dynamic cell antenna bonding table if the received MIMO communications signals by the at least one neighboring MIMO antenna of the at least one neighboring remote unit from the client device exceed the threshold MIMO communications signal quality.

20. The controller of claim 11, configured to identify the at least one neighboring remote unit to the first remote unit from a remote unit mapping table.

* * * * *